(12) United States Patent
Mainali

(10) Patent No.: US 11,184,350 B2
(45) Date of Patent: Nov. 23, 2021

(54) SYSTEM, APPARATUS AND METHOD FOR PRIVACY PRESERVING CONTEXTUAL AUTHENTICATION

(71) Applicant: OneSpan North America Inc., Chicago, IL (US)

(72) Inventor: Pradip Mainali, Ghent (BE)

(73) Assignee: OneSpan North America Inc., Chicago, IL (US)

( * ) Notice: Subject to any disclaimer, the term of this patent is extended or adjusted under 35 U.S.C. 154(b) by 386 days.

(21) Appl. No.: 16/276,440

(22) Filed: Feb. 14, 2019

(65) Prior Publication Data
US 2019/0260730 A1    Aug. 22, 2019

(30) Foreign Application Priority Data

Feb. 14, 2018 (EP) .................................. 18020061
Feb. 27, 2018 (EP) .................................. 18020083

(51) Int. Cl.
| | |
|---|---|
| H04L 29/06 | (2006.01) |
| G06N 20/00 | (2019.01) |
| G06F 21/31 | (2013.01) |
| G06K 9/62 | (2006.01) |
| H04W 12/06 | (2021.01) |
| G06F 21/62 | (2013.01) |
| H04W 12/02 | (2009.01) |

(52) U.S. Cl.
CPC ............ *H04L 63/083* (2013.01); *G06F 21/31* (2013.01); *G06F 21/316* (2013.01); *G06F 21/6254* (2013.01); *G06K 9/6218* (2013.01); *G06K 9/6267* (2013.01); *G06N 20/00* (2019.01); *H04L 63/0861* (2013.01); *H04L 63/0876* (2013.01); *H04W 12/02* (2013.01); *H04W 12/06* (2013.01)

(58) Field of Classification Search
CPC ............... H04L 63/083; H04L 63/0861; H04L 63/0876; H04W 12/02; H04W 12/06; G06F 21/31; G06F 21/316; G06F 21/6254; G06K 9/6218; G06K 9/6267; G06N 20/00
See application file for complete search history.

(56) References Cited

U.S. PATENT DOCUMENTS

| | | | | |
|---|---|---|---|---|
| 7,984,169 | B2 * | 7/2011 | Brunell | ............... H04L 61/2539 709/229 |
| 8,468,244 | B2 * | 6/2013 | Redlich | ............... G06Q 10/107 709/225 |
| 8,788,804 | B2 * | 7/2014 | Nagaraja | ............... G06F 21/606 713/151 |
| 9,047,488 | B2 * | 6/2015 | Allen | .................. G06F 21/6254 |
| 10,063,654 | B2 * | 8/2018 | Kirti | ..................... H04L 67/306 |
| 10,659,446 | B2 * | 5/2020 | Alexander | ............. H04L 63/08 |
| 2016/0197729 | A1 | 7/2016 | Jones | |
| 2017/0147575 | A1 * | 5/2017 | Pappu | ................. G06F 16/9014 |

(Continued)

OTHER PUBLICATIONS

1st European Office Action for European Application No. 18020083.4, dated Oct. 13, 2020 (Oct. 13, 2020)—7 pages.

(Continued)

*Primary Examiner* — Hosuk Song
(74) *Attorney, Agent, or Firm* — Culhane Meadows PLLC; Stephen J. Weed

(57) ABSTRACT

Methods and systems for authenticating users based on contextual data in a privacy preserving way are disclosed.

51 Claims, 3 Drawing Sheets

(56) References Cited

U.S. PATENT DOCUMENTS

2018/0012011 A9 1/2018 Spencer, III et al.
2018/0359233 A1* 12/2018 Alexander ............ H04L 63/083

OTHER PUBLICATIONS

Dang Tran Khanh et al.: "Cancellable fuzzy vault with periodic transformation for biometric template protection", IET Biometrics, IEEE, Michael Faraday House, Six Hills Way, Stevenage, Herts. SG1 2AY, UK, vol. 5, No. 3, Sep. 1, 2016 (Sep. 1, 2016), pp. 229-235.
Extended European Search Report for European Application No. 18020083.4, dated Aug. 28, 2018 (Aug. 28, 2018)—8 pages.
International Search Report and Written Opinion for International Application No. PCT/EP2019/053750, dated Jun. 4, 2019 (Jun. 4, 2019)—15 pages.
Qing-Yuan Jiang et al: "Scalable Graph Hashing with Feature Transformation", Jul. 25, 2015 (Jul. 25, 2015), XP055591822, Retrieved from the Internet: URL:https://pdfs.semanticscholar.org/7941/b231b4552a58ff55a9095e036c70be62lca6.pdf [retrieved on May 24, 2019], 4 pages.

* cited by examiner

SYSTEM, APPARATUS AND METHOD FOR PRIVACY PRESERVING CONTEXTUAL AUTHENTICATION

CROSS-REFERENCE TO RELATED APPLICATIONS

This application claims priority to European Patent Application No. EP18020061.0 filed on Feb. 14, 2018 and European Patent Application No. EP18020083.4 filed on Feb. 27, 2018, the contents of which are incorporated fully herein by reference.

FIELD OF THE INVENTION

The invention relates to securing interaction of users with computer-based applications such as securing remote access to computers and applications and remote transactions over computer networks. More in particular the invention relates to authenticating users based on contextual data while preserving the privacy of the users.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing a (remote) application are who they claim they are, how to ensure that transactions being conducted remotely are initiated by legitimate individuals, and how to ensure that transaction data have not been altered before being received at a remote application.

In some cases, a user may be accessing and interacting with a remote application using for example a client computing device that may be associated with the user. The client computing device may comprise a user's personal computing device that may be associated with the user, such as a user's smartwatch, smart glasses, smartphone, tablet or Personal Computer (PC). The client computing device may be connected over a network such as the internet to a remote server computer that may be hosting the remote application. The user may for example use the client computing device to login to the remote application, and/or to access information managed by the remote application (e.g., by reading, submitting, or changing such information), and/or to submit a transaction request to the remote application and/or approve a transaction proposed by the remote application or submitted to the remote application. In what follows, the client computing device may also be referred to as the personal client computing device, the access device or shortly as the client device.

To secure the access of users to the remote application or to secure the interaction of users with the remote application, the remote application may rely on an authentication system to authenticate users of the remote application. To authenticate a particular user, various techniques can be used. For example, one way of authenticating a user is for the user to communicate to the authentication system a secret, such as a password or a PIN (Personal Identification Number) that both the user and the authentication system know. Another way of authenticating a user is for the authentication system to obtain a measurement of a biometric trait of the user and to compare that measurement with a reference template of that biometric trait of that user. Still another way for authenticating a user is for the authentication system to receive and verify the validity of a dynamic credential that has been generated by an authentication device (such as a smart card, a strong authentication token or a smartphone with an authentication app) that is associated with the user and that is personalized with a secret value that is unique for that user, whereby the dynamic credential may be generated by the authentication device using a cryptographic algorithm that is parameterized with the secret value, for example by cryptographically combining the secret value with the value of a dynamic variable, such as for example a time value, a challenge which may be generated or provided by the authentication system, transaction data, and/or the value of a counter that may be maintained and automatically updated by the authentication device.

The above mentioned authentication methods have in common that they generally tend to require—to some extent—the active involvement and cooperation in the authentication process of the user that is being authenticated, for example by requiring the user to provide a password or communicate a dynamic credential, or to present a body part (like a finger) to a biometric sensor (like a fingerprint sensor) to enable a biometric measurement. While in some circumstances such active involvement and cooperation of the user may not be problematic, in other circumstances requiring the user to take on an active role in the authentication process may be considered too cumbersome or too inconvenient for the user.

An alternative way to authenticate a user without requiring the user to take on an active and conscious role in the authentication process, is for the authentication system to obtain a range of contextual data associated with the user being authenticated and to analyse that contextual data and to determine to what extent the obtained contextual data is consistent with the person that the user being authenticated claims to be.

Contextual data may include data at or around the moment of authentication, but may also include data from before the moment of authentication. Contextual data may include the time (for example the time of certain user actions such as the time of a login or access attempt), data about the access device itself that the user is using (which in what follows may be referred to as device data), data about the environment that the user (or, as a proxy, the user's access device) is in or has been in (which in what follows may be referred to as location data), or behavioural data about the way that the user is acting or behaving or has been acting or behaving recently (which in what follows may be referred to as behaviour data). Various contextual data may be associated with times at, close to or well before the moment of authentication.

Examples of location data may include the (geographical) coordinates of the physical location that the user (or the user's access device) is located, as may be given by a satellite navigation (such as the GPS—Global Positioning System or the Galileo positioning system) sensor of the user's access device. Examples of location data may also comprise information about wireless local area networking (for example Wi-Fi) access point(s), Bluetooth devices, or mobile telephony or mobile data networks and/or network base stations in the neighbourhood of the user's access device that the user's access device is aware of and/or is using, is connected to, or is communicating with. Other examples of location data may include data about physical characteristics of the environment of the location where the user (or the user's access device) is located, such as temperature, atmospheric pressure, local gravitational acceleration, sound level, illumination intensity, radioactivity intensity, . . . . . At least some of these location data may for example be captured by (local) sensors that may be comprised in, attached to, or accessible by the user's access device.

Examples of device data may include the IMEI (International Mobile Equipment Identity) and the IMSI (International Mobile Subscriber Identity) of the access device, data about the hardware and/or software configuration of the device model or type and version of the access device, the type and version of the operating system running on the access device, the names or types and versions of any applications or apps installed and/or running on the access device.

Examples of behaviour data may for example include the apps or applications that the user may have used recently (for example the last day or the last week), the absolute or relative amount of time that the user has used these apps or applications, and when the user has used which app or application (app usage pattern); and which phone calls the user has made, how long these phone calls have lasted and when the user made these phone calls (phone call pattern).

In the context of this description, the terminology 'contextual data' does not refer to biometric data. Biometric data (such as a user's fingerprint, iris pattern or hand palm pattern) tend to be independent of the context (in time and/or space) that the user is in and are therefore in the context of this description not considered to be contextual data.

The discussion of the background to the invention herein is included to explain the context of the invention. This shall not be taken as an admission that any of the material discussed above was published, known or part of the common general knowledge at the priority date of this application.

DISCLOSURE OF THE INVENTION

Technical Problem

A problem that may arise with an authentication system that relies on contextual data, is that many users may feel that at least some of the contextual data that relate to them and that are used by the authentication system may be sensitive from a privacy perspective, and that many users may for this reason by reluctant or even unwilling to allow such an authentication system to access and use that data out of fear that their privacy may be encroached upon. For example, many users may be unwilling to allow an authentication system to have knowledge about their whereabouts or about the (other) applications or websites that they have accessed.

What is needed is a solution for authenticating a user based on personal contextual data that does not compromise the privacy of the user being authenticated.

Technical Solution

One solution to the aforementioned problem is the invention described in the remainder of this description.

The inventor has realized that a considerable analysis on contextual data can be done for authentication purposes that does not really depend on the actual contextual data values themselves but rather on patterns in the sets of contextual data, whereas in many cases the privacy issues are related to the actual contextual data values themselves.

Privacy Preserving Transformation of Contextual Data

The inventor has further realized that if the contextual data are transformed prior to analysing the contextual data in such a way that the transformation is in practice unidirectional or irreversible (i.e., that from a computational point of view it is easy to do the transformation—i.e., compute the transformed data from the original data, but hard to undo or reverse the transformation—i.e., compute the original data from the corresponding transformed data), but the transformation preserves certain patterns or relationships between the contextual data values, then meaningful authentication analyses can still be carried out without the need to communicate privacy sensitive data to the analysing entity. In what follows, such transformation of contextual data elements that is unidirectional but that preserves certain informative patterns or relationships, may be referred to in the rest of this description as anonymization of contextual data elements.

Identity Relation Preserving Transformations

The inventor has further realized that in many cases the relation to be preserved may be one of whether or not a particular contextual data value is the same as another particular contextual data value. In what follows such a relation may be referred to as an identity relation. I.e., if an anonymization transformation transforms two values that happen to be the same into the same transformation value, and that anonymization transformation transforms two values that happen to be different into two different transformation values, then that anonymization transformation preserves the identity relation. Such a transformation may be termed an identity relation preserving transformation or (shortly) identity preserving transformation. In some embodiments, the identity relation that is preserved by the identity preserving transformation is the relation of whether two data values are truly identical in the narrow sense of the word. In other embodiments, the identity preserving transformation preserves an equivalence relation between the data values being transformed whereby the equivalence relation divides the set of possible data values into a set of equivalence classes, such that 'identity' of two data values is to be understood in a somewhat broader sense as being equivalent under the equivalence relation, i.e., belonging to the same equivalence class.

In some embodiments, it may not always be guaranteed with absolute certainty that the anonymization transformation transforms two values that happen to be different (or not equivalent) into two different (or not equivalent) transformation values, but the probability that two different (or not equivalent) values are transformed into the same (or equivalent) transformation value may be very small. If the probability for any particular pair of random different (or not equivalent) values to be transformed into the same (or equivalent) transformed value by the anonymization transformation is smaller than a certain threshold probability and the anonymization transformation transforms two values that happen to be the same (or equivalent) into the same (or equivalent) transformation value, then the transformation may still be termed an identity preserving transformation. In some embodiments, this probability threshold may be less than $1/1,000,000$. In other embodiments, it may be less than $1/1,000,000,000$. In some embodiments, the value of this probability threshold may be a function of a parameter of the transformation and the value of that parameter may be chosen such that the probability threshold is smaller than a specific chosen value.

In some embodiments, an identity preserving transformation of a contextual data element value may comprise applying a one-way function to that contextual data element value. In some embodiments, the one-way function may be parameterized with a salt (as described in more detail elsewhere in this application). The value of the salt may be fixed for a given user but may vary among a set of different users. In some embodiments, the value of the salt may be a secret that is only known to the agent or component performing the one-way function. In some embodiments the one-way function may comprise or may consist of a cryptographic hash function such as for example MD5 (Message Digest 5) or a member of the SHA (Secure Hash Algorithm) family of standardized hash functions, for example SHA-3 (Secure Hash Algorithm 3). In some embodiments, the one-way function may comprise a keyed hashing algorithm, such as for example HMAC (Hash-based Message Authentication Code). In some embodiments the key used in a keyed hashing algorithm may be a salt. In other embodiments, an identity relation preserving transformation may be used that is based on a cryptographic block cipher. In some embodiments, the one-way function may comprise or may consist of a cryptographic encryption-decryption function such as for example the AES (Advanced Encryption Standard) encryption-decryption algorithm. For example, in some embodiments, contextual data element value may be encrypted with an encryption algorithm. In some embodiments, the key that parameterizes the encryption algorithm may be a fixed value. In some embodiments, the value of the key may be a salt (as explained in more detail elsewhere in this description). In some embodiments, the key may be derived from the contextual data element value. In some embodiments, the key may be derived from the contextual data element value and the encryption algorithm parameterized with this key may operate on a fixed value (such as for example a salt value, which may be a secret).

Degree of Similarity Preserving Transformations

The inventor has also realized that in many other cases the relation to be preserved may be the degree that any particular contextual data value is similar (according to some computable measure) to any other particular contextual data value. In what follows, such a relation may be referred to as a similarity relation. In some embodiments, the similarity measure can be expressed as a discrete or continuous numerical value. In some embodiments, the similarity measure can be expressed as a Boolean value. In some embodiments, the set of all possible values of the similarity measure may be an ordered set. In some embodiments, the set of all possible values of the similarity measure may be a partially ordered set. In still other embodiments there may be no order defined between the various possible values of the similarity measure.

In various embodiments, the similarity measure may be computed in different ways. In some embodiments the similarity measure may be computed in different ways for different contextual data elements. For example, for scalar contextual data elements, the similarity measure may be computed using the absolute or relative difference (signed or unsigned) between two values of the same contextual data element. For contextual data elements that may be represented as vectors, the similarity measure between two values (i.e., vectors) of the same contextual data element can be computed using some distance function of these two values. In some embodiments, the distance function may be a Euclidean distance. In other embodiments, the distance function may be a Minkowski distance of order p (p-norm distance). In still other embodiments, other distance functions may be used such as the Canberra distance, the Chebyshev (or chessboard) distance. For contextual data elements that may be represented as strings of symbols (e.g., bits) of equal length, the Hamming distance may be used. For other contextual data elements, other distance functions may be used, such as for example an edit distance (e.g., the Levenstein distance) for strings, or the Lee distance. For example, for physical geographical locations an angular distance (e.g., as seen from the centre of the earth) may be used.

In some embodiments the similarity measure for the original values of a contextual data element may be computed in a different way than the similarity measure for the corresponding transformed (anonymized) contextual data element values. In some embodiments a first similarity measure may be used for the original values of a contextual data element and that first similarity measure may be different from a second similarity measure that may be used for the corresponding transformed (anonymized) contextual data element values, but the anonymizing transformation may preserve a relative degree of similarity, such that a higher (lower) degree of similarity (as expressed by the first similarity measure) between the original values translates into also a higher (lower) degree of similarity (as expressed by the second similarity measure) between the corresponding anonymized values. Such a transformation may be referred to as a degree of similarity preserving transformation.

In some embodiments, the contextual data element values to be transformed by the anonymization transformation may be elements of a first metric space and the first similarity measure for these contextual data element values may be the (first) metric defined on that first metric space, and the transformation values into which the anonymization transformation transforms the original contextual data element values may be elements of a second metric space and the second similarity measure for these contextual data element values may be the (second) metric defined on that second metric space. In some embodiments the first and/or second metrics may comprise any of the distance or similarity measures discussed in more detail elsewhere in this description. In some embodiments, the anonymization transformation may comprise a continuous function from the first metric space to the second metric space.

In some embodiments a similarity preserving anonymization transformation which transforms (for a given user) any first pair of contextual data element values into a first pair of transformed values and any second pair of contextual data element values into a second pair of transformed values, may have the properties that it transforms the contextual data values in such a way that:
  if according to the first similarity measure the first pair of contextual data element values is more similar than the second pair of contextual data element values then also the corresponding first pair of transformed values is more similar according to the second similarity measure than the second pair of contextual data element values, and that
  if according to the first similarity measure the first pair of contextual data element values is less similar than the second pair of contextual data element values then also the corresponding first pair of transformed values is less similar according to the second similarity measure than the second pair of contextual data element values.

Preserving Similarity within a Margin of Accuracy

In some embodiments, the similarity preserving anonymization transformation may preserve the degree of similarity between two different values of a contextual data element regardless of how small the difference between these two values may be. Such transformations preserve the relation of two data values being exactly identical or not. Therefore, such transformation may in principle also be used as identity preserving anonymization transformations. In other embodiments, the similarity preserving anonymization transformation may preserve the degree of similarity between two different values of a contextual data element only within a certain margin of accuracy. I.e., in some embodiments, the above mentioned properties for a similarity preserving anonymization transformation may only be fulfilled or guaranteed in case the difference in similarity between values being compared is larger (in an absolute sense or in a relative sense with respect to the magnitude of the values) than a certain threshold. For example, in some embodiments the relative similarity of the first pair of contextual data element values with respect to the second pair of contextual data element may be preserved by the anonymization transformation if the difference between the similarity of the first pair and the similarity of the second pair is larger than a certain threshold, but may not necessarily be preserved if that difference is smaller than that threshold. In some embodiments, this threshold may be a function of the magnitudes of the contextual data element values being compared. For example, in some embodiments this threshold may be expressed as a fixed percentage of the magnitude of the largest contextual data element value being compared.

Probabilistic Versus Deterministic Similarity Preservation

In some embodiments, the similarity preserving anonymization transformation may preserve the degree of similarity between two different values of a contextual data element only with a certain probability rather than with absolute certainty. I.e., in some embodiments, the above-mentioned properties for a similarity preserving anonymization transformation may only be fulfilled with a certain probability for a random user and/or for random values of the contextual data elements that are concerned by the similarity preserving anonymization transformation. In some embodiments the underlying mechanism of the similarity preserving anonymization transformation may by itself be fully deterministic, but the mechanism may for some particular values and/or users not preserve the above mentioned properties whereby it may dependent on the particular value of a first parameter (such as a salt) of the mechanism for exactly which particular values and/or users the similarity may not be preserved within a certain margin of accuracy, for example in cases whereby the value of that first parameter may be different from one user to another. In some of these embodiments the value of that first parameter may not be known to an analysis component that analyses the transformed contextual data element values produced by the anonymization transformation, such that the analysis component cannot determine for which particular users and/or contextual data elements this may be the case, and only a statistical probability can be given that this may happen for any random users and/or random contextual data element values. If the statistical probability of this happening for random users and/or random contextual data element values is sufficiently small, then the similarity preserving anonymization transformation may be considered to be a similarity preserving anonymization transformation in the probabilistic sense, i.e., it may be referred to as a probabilistically similarity preserving anonymization transformation. In some embodiments, the above-mentioned statistical probability (that the similarity is not preserved for a random user and a random set of contextual data values, or for a random value of the first parameter) may be lower than, for example, 1% or 0.1% or 0.01% percent. In some embodiments, this statistical probability may be a function of the value of a second parameter of the probabilistically similarity preserving anonymization transformation, whereby in some embodiments this second parameter may for example have the same value for all users or for a batch of users. For example, in some embodiments this statistical probability may be a function of a number of iterations in an algorithm used by the probabilistically similarity preserving anonymization transformation or it may be a function of the size of the transformed values. In some embodiments the value of this second parameter may be chosen to achieve an optimal trade-off between on the one hand a high probability of similarity preservation and on the other hand, for example, low demands with respect to processing power for performing the anonymization transformation and/or data communication bandwidth to communicate the transformed values from an anonymization component to an analysis component.

In some embodiments, such a probabilistically similarity preserving anonymization transformation may be modelled, e.g., from the perspective of an analysis component analysing the transformed values, as a deterministically similarity preserving anonymization transformation whereby (stochastic) noise has been added to the contextual data element values before the anonymization transformation and/or to the transformed values after the anonymization transformation.

Difference Between Similarity Preserving Anonymization Transformations and Blurring Transformations It is conceivable that, in an attempt to provide some level of privacy protection, some authentication systems that collect and process privacy sensitive data could 'blur' certain privacy sensitive data values. I.e., such authentication systems could sacrifice some accuracy on the collected data values thereby introducing uncertainty on what the precise original values were before this blurring and as a consequence thereby reducing somewhat the privacy issues. Such blurring of collected data values may for example be done by retaining only the most significant digits of the data values (or dropping the least significant digits of the data values). This may for example by done by rounding or truncating the data values to a certain level of accuracy. For example, an authentication system collecting and using the GPS coordinates of the location of a user's smartphone may round or truncate the collected GPS coordinates such that they retain an accuracy of no more than 5 kilometres. However, for such simple blurring systems, what is gained in terms of privacy (the loss of accuracy of the blurred data values compared to the accuracy of the original data values) is essentially equal to what is lost in terms of the accuracy that is available to the analysis component when analysing the blurred data values. In other words, in such simple blurring systems, analysis accuracy is traded in for privacy in equal measures. For this reason, such simple blurring operations are not examples of similarity preserving anonymization transformations as this terminology is to be understood in this description. In some embodiments, the similarity preserving anonymization transformation is a transformation that projects values from a domain space onto values in an image space in such a way that, given the value in the image space, the original value in the domain space cannot be computed with a margin of uncertainty that is less than a predetermined privacy threshold, whereby the similarity preserving anonymization nevertheless permits determining proximity or similarity of values in the image space at an accuracy level that corresponds to a distance or difference below said predetermined privacy threshold (i.e., a degree of similarity that is beyond said predetermined privacy threshold) in the domain space. In some embodiments, the similarity preserving anonymization transformation is a transformation that projects values from a domain space onto values in an image space in such a way that, given the value in the image space, the original value in the domain space cannot be computed with a margin of accuracy that exceeds a predetermined privacy threshold, whereby the similarity preserving anonymization nevertheless permits determining proximity or similarity of values in the image space at a level of accuracy that corresponds to a degree of similarity in the domain space that does exceed said predetermined privacy threshold.

The terminology similarity preserving anonymization transformation as used in this description refers to similarity preserving transformations whereby the gain in privacy for a particular original data value after transformation is much higher than the loss in accuracy available for analysis. A measure for the gain in privacy may be the (average) increase in uncertainty with respect to the actual original value of a data element that was transformed into a given transformed value. This may be estimated as the (average) entropy of the set of all original data values that would have resulted in the same given transformed value. Similarly, a measure for the loss in accuracy for analysis may be the ratio between the accuracy in the degree of similarity of the transformed values to the accuracy in the degree of similarity of the original data values. The ratio of the gain in privacy to the loss in analysis accuracy is in general a function of the chosen similarity preserving anonymization transformation. This ratio may be referred to as the privacy-enhancing factor of the chosen similarity preserving anonymization transformation. In some embodiments, this privacy-enhancing factor is a function of a parameter of the similarity preserving anonymization transformation. In some embodiments, the privacy-enhancing factor is at least 10. In other embodiments, it is at least 1000. In still other embodiments, it is at least 1,000,000.

Different Categories of Contextual Data

In some embodiments some contextual data that are deemed to be privacy sensitive may be distinguished from, and may be treated differently than, other contextual data that are not deemed to be privacy sensitive.

Computable and Non-Computable Contextual Data

Another distinction between different types of contextual data that may be made by some embodiments is a distinction between computable and non-computable contextual data.

Computable contextual data are data whereby the similarity between data values plays a role in the analysis of that data, i.e., to what degree two values are similar. For example, in some embodiments 'geographical location' may be a contextual data element and the analysis of the geographical location data values may take into account or may be based on the distance between the geographical location corresponding to one data value and the geographical location corresponding to another data value. For example, the analysis may draw certain conclusions from a new data value collected for a particular user which indicates a geographical location that is very near to geographical locations that correspond to a large number of geographical location data values that have been recorded in the recent past for the same user, whereas the analysis may draw very different conclusions if that new data value indicates a geographical location that is very far from any geographical locations that correspond to geographical location data values that have been recorded in the past for that same user.

Non-computable contextual data are data whereby some degree of similarity between data values—other than whether the data values are identical (or equivalent according to some equivalence relation)—does not play a role in the analysis of that data, but whereby the analysis is based on whether a given data value is or is not the same (or equivalent according to some equivalence relation) as another data value. For example, in some embodiments the contextual data may include the name of the Bluetooth device that the user's smartphone has last been paired with and the analysis may take into account whether a current value for that name is the same as name values that were recorded in the past for the same user or rather whether it is different from any names that were recorded in the past for that user; however the analysis may attribute no value whatsoever to the degree that the current name value may or may not be similar (according to some criteria) to any name values recorded in the past.

Examples of Computable Contextual Data

Computable contextual data elements may include for example: time, location, location accuracy, temperature, atmospheric pressure, local gravitational acceleration, sound level, illumination intensity, radioactivity intensity, Wi-Fi RSSI (Received Signal Strength Indicator), Wi-Fi RCPI (Received Channel Power Indicator), mobile network RSSI, duration of usage of various apps (for example for each of the top ten most frequently used apps), duration of outgoing/incoming calls (for example of the last 20 calls), Wi-Fi data volume (received and/or transmitted), data volume over telephone network (received and/or transmitted), . . . .

Examples of Non-Computable Contextual Data

Non-computable contextual data elements may include for example: Wi-Fi router MAC (Media Access Control) address, Wi-Fi SSID (Service Set IDentifier), Wi-Fi IP Address, Wi-Fi network ID, Wi-Fi router IP Address, Wi-Fi router DNS-1, Wi-Fi router DNS-2, SIM state, mobile network data state, mobile network data type, mobile network operator name, mobile network MCC (Mobile Country Code) & MNC (Mobile Network Code), mobile network LAC (Location Area Code), mobile network Cell ID, SIM (Subscriber Identity Module) serial number, IMEI (International Mobile Equipment Identity), IMSI (International mobile subscriber identity), phone type (GSM—Global System for Mobile Communications/CDMA—Code-division multiple access), list of Wi-Fi configured names, list of Wi-Fi configured BSSID, Bluetooth state, Bluetooth name, Bluetooth MAC, Bluetooth paired device names, Bluetooth paired device addresses, Bluetooth paired device states, Bluetooth paired device types, Bluetooth paired device classes, device name, device model, device brand, device manufacturer, device serial number, device OS (Operating System) name, device OS version, list of apps installed on the device, list of apps most used, list of outgoing or incoming calls (numbers or names), . . . .

Different Anonymization Treatment of Different Categories of Contextual Data

In some embodiments of the invention, the contextual data are grouped into three categories: contextual data that are not privacy sensitive; non-computable privacy-sensitive contextual data; and computable privacy-sensitive contextual data. In some embodiments at least some of the contextual data that are not privacy sensitive may be not anonymized, i.e., they are not transformed using a privacy preserving transformation. In some embodiments, at least some of the privacy-sensitive contextual data may be anonymized by an anonymization transformation in order to preserve the privacy. In some embodiments, at least some of the non-computable privacy-sensitive contextual data may be transformed by an identity preserving anonymization transformation, i.e., non-computable privacy-sensitive contextual data element values may be transformed using an anonymization transformation that merely preserves the relationship of whether or not a particular non-computable privacy-sensitive contextual data element value is the same as another particular value of that non-computable privacy-sensitive contextual data element value. In some embodiments, at least some of the computable privacy-sensitive contextual data may be transformed by a similarity preserving anonymization transformation, i.e., the computable privacy-sensitive contextual data element values may be transformed using an anonymization transformation that preserves the relationship of to what extent a particular computable privacy-sensitive contextual data element value is similar to another particular value of that computable privacy-sensitive contextual data element.

Anonymizing Contextual Data Element Values by Using a One-Way Function

In some embodiments, the privacy preserving anonymization transformation of a contextual data element may comprise or may consist of applying a one-way function to the value of the contextual data element, wherein a one-way function is a mathematical function that is easy to compute on every input, but hard to invert given the image (i.e., the result of applying the function) of a random input. For example, in some embodiments the preserving anonymization transformation may comprise a cryptographic hashing function such as for example SHA-1. An advantage of using a privacy preserving anonymization transformation that comprises or consists of a one-way function is that it may be hard or computationally infeasible to obtain the original value of a contextual data element if only its transformed value is given, which protects the privacy of these original contextual data element values, while it preserves the identity relation of two data values that are the same.

Usage of a Salt in the Privacy Preserving Transformation

In some embodiments, the one-way function may have an additional input or may be parameterized with an additional data element. This additional data element may have a high entropy. This additional input or data element may function as a cryptographic salt to defend against a dictionary attack. In what follows such an additional input or data element functioning as a cryptographic salt may be referred to simply as a salt. For example, in some embodiments, the anonymization transformation may comprise or may consist of a cryptographic hash function that is applied to a combination of such a salt and the contextual data element value to be transformed. In some embodiments, the one-way function may comprise or may consist of a cryptographic encryption-decryption function (for example a block cipher such as AES) parameterized with a key acting as a salt. In some embodiments the value of the salt may be initialized on an access device during an initialization phase and may be stored (e.g., on the access device) for future use in multiple subsequent authentication sessions.

Keeping the Salt Secret to the Anonymization Component

In some embodiments, the salt may be generated in a way that its value is unpredictable for third parties. For example, in some embodiments the salt may be generated using the output of a pseudo or a true random generator. In some embodiments, the salt may be a value that is kept secret. In some embodiments, the salt value may be only known to the anonymization component, i.e. the component or device performing the anonymization transformation (which may for example be or may be comprised in the user's access device), and the salt value may not even be shared with other components of the authentication system. For example, in some embodiments, the anonymization component may comprise or may be comprised in the user's access device, and the salt value may be only known to the access device and may not even be shared with other components of the authentication system that don't reside on the access device. For example, in some embodiments the salt may be generated (preferably by or on the anonymization component itself) as a secret value and may be stored in a secure way by the anonymization component. In some embodiments, the salt may be generated by an authentication component on the access device and is only accessible by this authentication component. In some embodiments, the authentication component on the access device doesn't share the secret salt with any other component, not even other components (such as an authentication server) of the authentication system that the authentication client component is a part of. In some embodiments, the secret salt is not shared with an authentication component that is adapted or configured to analyse the transformed contextual data element values and which may be comprised in an authentication server.

Individualizing the Salt Values

In some embodiments, the salt may be a value that may be different for each user or for each access device. In some embodiments, the salt may be generated and initialized in such a way that it is unique for every user or for every access device. In some embodiments, the salt may be generated in such a way that the probability that the salts of two different users or of two different access devices have the same values is negligible. For example, in some embodiments the salt may be generated using the output of a pseudo or a true random generator, whereby the output values of that random generator may have a high entropy. In some embodiments, the same salt may be used for transforming all contextual data elements on the same access device. In some embodiments, the contextual data elements may be grouped in categories and a different salt value may be used for each different category. In some embodiments, a different salt value may be used for each different contextual data element.

Advantages of Salted One-Way Transformation Functions

Salting the one-way transformation function with a secret salt value, may increase the entropy of the possible outputs of the transformation function thus making infeasible a brute force attack to reverse the transformation function (even if the range of possible input values may in some cases be rather limited in practice). Keeping the salt value secret from even the authentication system (except for the system's component responsible for the anonymization transformation) may ensure that the privacy of the anonymized data remains intact even in case of a breach of any authentication system's components other than the component or components handling the naked not-yet-anonymized data. Individualizing the salt values (i.e., using different salt values for different users and/or different access devices) may have the effect of breaking any correlation that may otherwise exist between the anonymized values of certain data elements of any particular user with the anonymized values of the same data elements of another user, and may thus frustrate attempts to retrieve the original non-anonymized values of certain data elements for a particular first user by comparing these anonymized values of particular data elements of this particular first user with the anonymized values of the same data elements of another second user for which the original non-anonymized values that correspond to the anonymized values of that second user are known.

In some embodiments, a function or algorithm to transform contextual data element values is applied to each of a set of different contextual data elements separately such that the result of the transformation of the value of one contextual data element is not a function of (i.e., is independent of) the value of another contextual data element. In some embodiments, different transformation functions or algorithms may be applied to different types of contextual data elements or to the values of different contextual data elements.

Privacy Preserving Transformation of Non-Computable Contextual Data

In some embodiments, the privacy preserving transformation applied to the values of at least one non-computable contextual data element may be an identity relation preserving anonymization transformation. In some embodiments, all anonymization transformations operating on non-computable contextual data may be identity relation preserving anonymization transformations. In some embodiments, at least one or all of the anonymization transformations operating on non-computable contextual data may be salted. In some embodiments, at least one or all of the identity relation preserving anonymization transformations operating on non-computable contextual data may be salted.

Privacy Preserving Transformation of Computable Contextual Data

In some embodiments, the privacy preserving transformation applied to the values of at least one computable contextual data element may be a similarity preserving anonymization transformation. In some embodiments, all anonymization transformations operating on computable contextual data may be similarity preserving anonymization transformations. In some embodiments, at least one or all of the anonymization transformations operating on computable contextual data may be salted. In some embodiments, at least one or all of the similarity preserving anonymization transformations operating on computable contextual data may be salted.

In one aspect of the invention, a method is provided for using contextual data related to a user in a privacy preserving way. In some embodiments, the method may be to secure a user's interaction with a remotely accessible computer-based application, for example as part of a mechanism for authenticating a user of that remotely accessible computer-based application or for securing transaction requests submitted by the user to of that remotely accessible computer-based application. In some embodiments, the method may comprise any of the methods described elsewhere in this description. In some embodiments, the method may be used with any of the systems described elsewhere in this description.

In a first set of embodiments, the method may comprise the steps of: collecting one or more sets of contextual data; anonymizing the collected one or more sets of contextual data; transferring the anonymized contextual data sets to an authentication server; at the authentication server analyzing the received anonymized contextual data sets for authenticating the user; wherein the one or more sets of contextual data comprise at least: values of one or more computable contextual data elements, or values of one or more non-computable contextual data elements; wherein the step of anonymizing the collected one or more sets of contextual data comprises at least: transforming a first value of at least one of said computable contextual data elements using a similarity preserving anonymization transformation, or transforming a second value of at least one of said non-computable contextual data elements using an identity relation preserving anonymization transformation. In some embodiments, the one or more sets of contextual data that are collected may comprise sets of contextual data related to a single particular user. In some embodiments, the one or more sets of contextual data may be collected at different moments in time (and the time that a set of contextual data is collected may itself be one of the data elements in the collected contextual data set). In some embodiments, the step of analyzing the received anonymized contextual data sets may comprise learning or training a model using some of the received anonymized contextual data sets, e.g., using some machine learning algorithm. In some embodiments, the step of analyzing the received anonymized contextual data sets may comprise updating the model using some of the received anonymized contextual data sets. In some embodiments, the step of analyzing the received anonymized contextual data sets may comprise comparing the model to one or more of the received anonymized contextual data sets, for example to estimate the likelihood that the current user for which the one or more of the received anonymized contextual data set that the model is compared to have been collected, is (still) the same user as the user for which the received anonymized contextual data sets have been collected that have been used for training and/or updating the model.

In a second set of embodiments, the method may comprise any method of the first set of embodiments wherein the values of at least some of the anonymized contextual data may be a function of the original values of the collected contextual data prior to anonymization and the value of a salt. In some embodiments the same value of the salt may be used in the anonymization of multiple or all of the collected sets of contextual data related to the same particular user and a same personal client computing device used by that particular user.

In a third set of embodiments, the method may comprise any method of the second set of embodiments wherein at least said similarity preserving anonymization transformation or said identity relation preserving anonymization transformation may be parameterized by a parameter which is a function of said salt value.

In a fourth set of embodiments, the method may comprise any method of the second or third sets of embodiments wherein said anonymizing the collected one or more sets of contextual data may be performed by an anonymization component and wherein said salt value is known only to said anonymization component. In some embodiments, the anonymization component may be comprised (partially or entirely) in a personal client computing device used by the user, for example as part of a software application running on said personal client computing device.

In a fifth set of embodiments, the method may comprise any method of any of the second to fourth sets of embodiments wherein the method may further comprise generating the salt value using a random generator or a pseudo-random generator.

In a sixth set of embodiments, the method may comprise any method of any of the second to fifth sets of embodiments, wherein the method may comprise generating said salt value during an initialization phase and storing said generated salt value in non-volatile memory which may for example by comprised in a personal client computing device used by the user.

In a seventh set of embodiments, the method may comprise any method of any of the second to sixth sets of embodiments wherein said anonymizing the collected one or more sets of contextual data may be performed on a personal client computing device associated with said user, whereby said salt value may comprise a specific value that has been generated for that individual personal client computing device associated with said user and whereby that specific value may be different from salt values generated for other personal client computing devices associated with other users.

In an eighth set of embodiments, the method may comprise any method of any of the preceding sets of embodiments, wherein the step of anonymizing the collected one or more sets of contextual data comprises said transforming a first value of at least one of said computable contextual data elements using a similarity preserving anonymization transformation. In some embodiments said analysing the received anonymized contextual data for authenticating the user may comprise exploiting a similarity between various received anonymized contextual data sets that may be preserved by said similarity preserving anonymization transformation. In some embodiments said analysing the received anonymized contextual data for authenticating the user may comprise exploiting a similarity between various received values of one or more contextual data elements of one or more anonymized contextual data sets that may be preserved by said similarity preserving anonymization transformation. In some embodiments 'exploiting the similarity' may comprise assessing a degree of proximity or similarity between the received values and corresponding expected values or reference values or other received values in the image space of the transformation, and using that degree of similarity as an element in authenticating the user, for example, by using that degree of similarity to determine or to generate an authentication score such as a score that reflects a degree that said received anonymized contextual data match a learnt user data model. In some embodiments, the corresponding expected values or reference values may for example be earlier received values or may be calculated from earlier received values, for example as a mean of a number of earlier received values or as a representative value for a cluster of earlier received values.

In a ninth set of embodiments, the method may comprise any method of any of the preceding sets of embodiments wherein said similarity may comprise a measure of distance.

In a tenth set of embodiments, the method may comprise any method of any of the preceding sets of embodiments wherein said similarity preserving anonymization transformation may comprise a Location Sensitive Hashing transformation of, for example, a location-based data element based on the location of a personal client computing device used by the user.

In an eleventh set of embodiments, the method may comprise any method of the tenth set of embodiments wherein said similarity preserving anonymization transformation may comprise a data-independent Location Sensitive Hashing transformation.

In a $12^{th}$ set of embodiments, the method may comprise any method of any of the tenth to eleventh sets of embodiments wherein said similarity preserving anonymization transformation comprises a Super Bit Location Sensitive Hashing transformation.

In a $13^{th}$ set of embodiments, the method may comprise the method of any of the preceding sets of embodiments wherein said similarity preserving anonymization transformation may preserve said similarity in a probabilistic sense.

In a $14^{th}$ set of embodiments, the method may comprise any method of any of the first to ninth sets of embodiments wherein said similarity preserving anonymization transformation may preserve said similarity in a deterministic sense.

In a $15^{th}$ set of embodiments, the method may comprise any method of any of the preceding sets of embodiments, wherein the step of anonymizing the collected one or more sets of contextual data comprises said transforming a second value of at least one of said non-computable contextual data elements using an identity relation preserving anonymization transformation.

In a $16^{th}$ set of embodiments, the method may comprise any method of the $15^{th}$ set of embodiments wherein said analysing the received anonymized contextual data for authenticating the user may comprise exploiting an identity or (equivalence) between a first received value of a first contextual data element of a first received anonymized contextual data set and a second received value of a second contextual data element of a second (previously) received anonymized contextual data set. In some embodiments exploiting the identity or (equivalence) may comprise assessing whether received values are the same (or equivalent) to corresponding expected values or reference values or other received values in the image space of the transformation and using the result of that assessment as an element in authenticating the user, for example, by using the result of that assessment to determine or to generate an authentication score such as a score that reflects a degree that said received anonymized contextual data match a learnt user data model. In some embodiments, the corresponding expected values or reference values may for example be earlier received values.

In a $17^{th}$ set of embodiments, the method may comprise any method of any of the preceding sets if embodiments wherein said identity relation preserving anonymization transformation may comprise applying a cryptographic hashing algorithm.

In an $18^{th}$ et of embodiments, the method may comprise any method of any of the preceding sets of embodiments wherein the method may further comprise the step of learning (or training) one or more user models for said user using at least some of said anonymized collected one or more sets of contextual data. In the remainder of this description, the terminology user model, user data model or user authentication data model may be used interchangeably.

In a $19^{th}$ set of embodiments, the method may comprise any method of the $18^{th}$ set of embodiments, wherein said step of learning one or more user models for said user using at least some of said anonymized collected one or more sets of contextual data comprises applying a machine learning algorithm to said at least some of said anonymized collected one or more sets of contextual data.

In a $20^{th}$ set of embodiments, the method may comprise any method of the $18^{th}$ or $19^{th}$ set of embodiments wherein the step of analyzing the received anonymized contextual data sets for authenticating the user may comprise comparing at least some of said received anonymized contextual data sets with said learnt one or more user models.

In a $21^{st}$ set of embodiments, the method may comprise any method of the $20^{th}$ set of embodiments, wherein the method may further comprise generating a score that reflects a degree that said at least some of said received anonymized contextual data sets match said learnt one or more user models.

In a $22^{nd}$ set of embodiments, the method may comprise any method of any of the $19^{th}$ to $21^{st}$ set of embodiments wherein said machine learning algorithm may comprise a non-supervised machine learning algorithm.

In a $23^{rd}$ set of embodiments, the method may comprise any method of any of the $19^{th}$ to $22^{nd}$ set of embodiments wherein said machine learning algorithm may comprise a clustering algorithm.

In a 24th set of embodiments, the method may comprise any method of the 23rd set of embodiments wherein said machine learning algorithm may comprise a Kmeans algorithm.

In a 25th set of embodiments, the method may comprise any method of any of the 18th to 24th sets of embodiments wherein the method may further comprise updating said learnt one or more user models. In some embodiments, said updating said learnt one or more user models may comprise using at least one of said collected one or more sets of contextual data.

In a 26th set of embodiments, the method may comprise any method of the 25th set of embodiments wherein said updating of said learnt one or more user models is performed at regular intervals.

In a 27th set of embodiments, the method may comprise any method of the 25th or 26th sets of embodiments wherein said updating of said learnt one or more user models uses at least some anonymized contextual data sets that have been received since the previous occurrence of said updating of said learnt one or more user models.

In a 28th set of embodiments, the method may comprise any method of any of the preceding sets of embodiments wherein the steps of collecting one or more sets of contextual data, anonymizing the collected one or more sets of contextual data and transferring the anonymized contextual data sets to an authentication server, may be performed at a personal client computing device associated with said user, whereby said personal client computing device may be physically distinct from said authentication server.

In a 29th set of embodiments, the method may comprise any method of the 28th set of embodiments wherein the steps of collecting one or more sets of contextual data and anonymizing the collected one or more sets of contextual data are performed by a software application running on said personal client computing device. In some embodiments, said software application may comprise the anonymization component of the fourth set of embodiments.

In another aspect of the invention, a system is provided for using contextual data related to a user in a privacy preserving way. In some embodiments, the system may be adapted to secure a user's interaction with a remotely accessible computer-based application, for example as part of a mechanism for authenticating a user of that remotely accessible computer-based application or for securing transaction requests submitted by the user to of that remotely accessible computer-based application. In some embodiments, the system may comprise any of the systems described elsewhere in this description. In some embodiments the system may be adapted to perform any of the methods described elsewhere in this description.

In a first set of embodiments, the system may comprise: a collection component adapted to collect one or more sets of contextual data; an anonymization component adapted to anonymize the one or more sets of contextual data collected by the collection component; an authentication server adapted to analyze the anonymized one or more sets of contextual data; wherein the one or more sets of contextual data collected by the collection component comprise at least: values of one or more computable contextual data elements, or values of one or more non-computable contextual data elements; wherein the anonymization component anonymizing the collected one or more sets of contextual data comprises the anonymization component at least: transforming a first value of at least one of said computable contextual data elements using a similarity preserving anonymization transformation, or transforming a second value of at least one of said non-computable contextual data elements using an identity relation preserving anonymization transformation.

In a second set of embodiments, the system may comprise any system of the first set of embodiments of the system wherein the collection component may be comprised in a personal client computing device associated with and used by the user, for example as part of a software application running on said personal client computing device.

In a third set of embodiments, the system may comprise any system of the second set of embodiments of the system wherein the collection component may be adapted to receive values of at least some contextual data elements of said one or more sets of contextual data from one or more hardware sensors comprised in said personal client computing device.

In a fourth set of embodiments, the system may comprise any system of the second or the third set of embodiments of the system wherein the collection component may be adapted to receive values of at least some contextual data elements of said one or more sets of contextual data from an operating system of said personal client computing device.

In a fifth set of embodiments, the system may comprise any system of any of the second to fourth set of embodiments of the system wherein the anonymization component may also be comprised in the personal client computing device, for example as part of a software application running on said personal client computing device.

In a sixth set of embodiments, the system may comprise any system of any of the second to fifth sets of embodiments of the system wherein at least the collection component is comprised in a software client application running on said personal client computing device.

In a seventh set of embodiments, the system may comprise any system of the sixth set of embodiments of the system wherein also said anonymization component is comprised in said software client application.

In an eighth set of embodiments, the system may comprise any system of any of the second to seventh sets of embodiments of the system wherein the personal client computing device may be physically distinct from the authentication server and whereby the authentication server may be adapted to receive said anonymized one or more sets of contextual data over a data communication network linking the personal client computing device and the authentication server. In some embodiments said data communication network may comprise a computer network such as the internet and/or a mobile data communication network.

In a ninth set of embodiments, the system may comprise any system of any of the first to eighth sets of embodiments of the system wherein the values of at least some of the anonymized contextual data may be a function of on the one hand the original values of the collected contextual data prior to anonymization and on the other hand the value of a salt.

In a tenth set of embodiments, the system may comprise any system of the ninth set of embodiments of the system wherein at least said similarity preserving anonymization transformation or said identity relation preserving anonymization transformation may be parameterized by a parameter which is a function of said salt value.

In an 11th set of embodiments, the system may comprise any system of the ninth or tenth set of embodiments of the system wherein said salt value may be known only to said anonymization component.

In a 12th set of embodiments, the system may comprise any system of the ninth to eleventh set of embodiments of the system wherein the salt value may be generated using a random generator or a pseudo-random generator.

In a 13$^{th}$ set of embodiments, the system may comprise any system of the ninth to 12$^{th}$ sets of embodiments of the system wherein said salt value may be generated during an initialization phase and stored in a non-volatile memory, for example in a non-volatile memory of the personal client computing device.

In a 14$^{th}$ set of embodiments, the system may comprise any system of any of the ninth to 13$^{th}$ sets of embodiments of the system wherein said anonymization component may be comprised in a personal client computing device associated with and used by said user, whereby said salt value may comprise a specific value that has been generated for that individual personal client computing device associated with said user and that may be different from salt values generated for other personal client computing devices that are associated with other users.

In a 15$^{th}$ set of embodiments, the system may comprise any system of the first to 14$^{th}$ sets of embodiments of the system wherein said anonymizing, by said anonymization component, of the collected one or more sets of contextual data comprises said transforming a first value of at least one of said computable contextual data elements using a similarity preserving anonymization transformation. In some embodiments, said analysing, by said authentication server, of the anonymized contextual data for authenticating the user may comprise exploiting a similarity between various received anonymized contextual data sets that is preserved by said similarity preserving anonymization transformation. In some embodiments said analysing, by said authentication server, of the anonymized contextual data for authenticating the user may comprise exploiting a similarity between various received values of one or more contextual data elements of one or more anonymized contextual data sets that may be preserved by said similarity preserving anonymization transformation.

In a 16$^{th}$ set of embodiments, the system may comprise any system of the first to 15$^{th}$ sets of embodiments of the system wherein said similarity may comprise a measure of distance.

In a 17$^{th}$ set of embodiments, the system may comprise any system of the first to 16$^{th}$ sets of embodiments of the system wherein said similarity preserving anonymization transformation may comprise a Location Sensitive Hashing transformation.

In an 18$^{th}$ set of embodiments, the system may comprise any system of the 17$^{th}$ set of embodiments of the system wherein said similarity preserving anonymization transformation may comprise a data-independent Location Sensitive Hashing transformation.

In a 19$^{th}$ set of embodiments, the system may comprise any system of the 17$^{th}$ or 18$^{th}$ sets of embodiments of the system wherein said similarity preserving anonymization transformation may comprise a Super Bit Location Sensitive Hashing transformation.

In a 20$^{th}$ set of embodiments, the system may comprise any system of the first to 19$^{th}$ sets of embodiments of the system wherein said similarity preserving anonymization transformation may preserve said similarity in a probabilistic sense.

In a 21$^{st}$ set of embodiments, the system may comprise any system of the first to 16$^{th}$ sets of embodiments of the system claims wherein said similarity preserving anonymization transformation may preserve said similarity in a deterministic sense.

In a 22$^{nd}$ set of embodiments, the system may comprise any system of the first to 21$^{st}$ sets of embodiments of the system wherein said anonymizing, by said anonymization component, of the collected one or more sets of contextual data comprises said transforming a second value of at least one of said non-computable contextual data elements using an identity relation preserving anonymization transformation.

In a 23$^{rd}$ set of embodiments, the system may comprise any system of the 22$^{nd}$ set of embodiments of the system wherein said analysing, by said authentication server, of the received anonymized contextual data for authenticating the user comprises exploiting an identity between a first received value of a first contextual data element of a first received anonymized contextual data set and a second received value of a second contextual data element of a second (previously) received anonymized contextual data set.

In a 24$^{th}$ set of embodiments, the system may comprise any system of the first to 23$^{rd}$ sets of embodiments of the system wherein said identity relation preserving anonymization transformation may comprise applying a cryptographic hashing algorithm. In some embodiments, the cryptographic hashing algorithm may be parameterized with a salt value such as the salt value of the ninth set of embodiments.

In a 25$^{th}$ set of embodiments, the system may comprise any system of the first to 24$^{th}$ sets of embodiments of the system that may further comprise a user model learning component adapted to learn or train one or more user models for said user by using at least some of said anonymized collected one or more sets of contextual data. In some embodiments, the user model learning component may be comprised in the authentication server. In some embodiments, the user model learning component may be a software module that is running on the authentication server.

In a 26$^{th}$ set of embodiments, the system may comprise any system of the 25$^{th}$ set of embodiments of the system wherein said user model learning component may be adapted to learn one or more user models for said user by applying a machine learning algorithm to said at least some of said anonymized collected one or more sets of contextual data.

In a 27$^{th}$ set of embodiments, the system may comprise any system of the 25$^{th}$ or 26$^{th}$ sets of embodiments of the system wherein said analysing, by the authentication server, of the received anonymized contextual data sets for authenticating the user may comprise comparing at least some of said received anonymized contextual data sets with said learnt one or more user models.

In a 28$^{th}$ set of embodiments, the system may comprise any system of the 27$^{th}$ set of embodiments of the system wherein the authentication server may be further adapted to generate a score that reflects a degree that said at least some of said received anonymized contextual data sets match said learnt one or more user models.

In a 29$^{th}$ set of embodiments, the system may comprise any system of the 26$^{th}$ to 28$^{th}$ sets of embodiments of the system wherein said machine learning algorithm may comprise a non-supervised machine learning algorithm.

In a 30$^{th}$ set of embodiments, the system may comprise any system of the 26$^{th}$ to 29$^{th}$ sets of embodiments of the system wherein said machine learning algorithm may comprise a clustering algorithm.

In a 31$^{st}$ set of embodiments, the system may comprise any system of the 30$^{th}$ set of embodiments of the system wherein said machine learning algorithm may comprise a Kmeans algorithm.

In a 32$^{nd}$ set of embodiments, the system may comprise any system of the 25$^{th}$ to 31$^{st}$ sets of embodiments of the wherein said user model learning component may be further adapted to update said learnt one or more user models.

In a 33$^{rd}$ set of embodiments, the system may comprise any system of the 32$^{nd}$ set of embodiments of the system wherein said user model learning component may perform said updating of said learnt one or more user models at regular intervals.

In a 34$^{th}$ set of embodiments, the system may comprise any system of the 32$^{nd}$ or 33$^{rd}$ sets of embodiments of the system claims wherein said user model learning component may be further adapted to update said learnt one or more user models using at least some anonymized contextual data sets that have been received since the previous occurrence of said updating of said learnt one or more user models.

More details of these various embodiments are provided in the paragraphs below.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention. Various specific details are provided in order to enable a thorough understanding of the invention. However, it will be understood by a person skilled in the relevant art that the present invention may be practiced without these specific details. In other instances, well-known methods, procedures, components and circuits have not been described in detail so as not to obscure the present invention. Various modifications to the described embodiments will be apparent to persons skilled in the art, and the general principles of the embodiments described in detail below may be applied to other embodiments.

Figure 2:
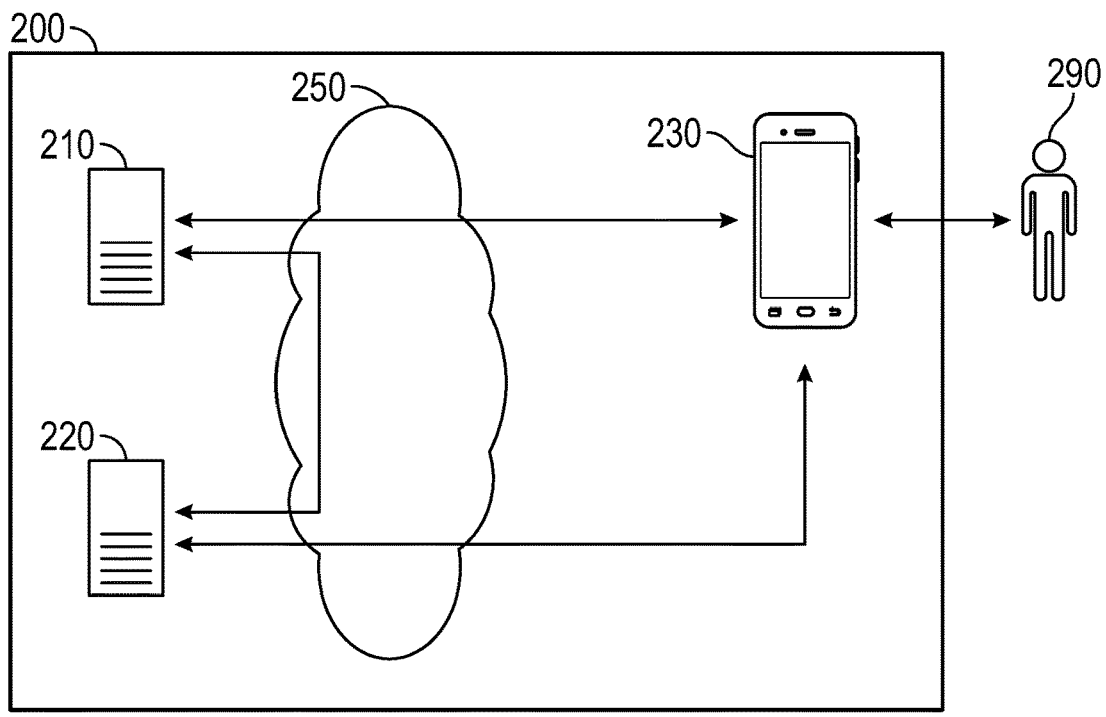
FIG. 2 schematically illustrates an exemplary system according to an aspect of the invention.

FIG. 2 schematically illustrates an exemplary system according to an aspect of the invention.

In one embodiment a system (200) according to the invention may comprise the following components:

One or more remote application server computers (210). The one or more remote application server computers (210) may host one or more remote applications which may be remotely accessible by one or more users of a plurality of users (290). The one or more remote applications may comprise for example any of the remote applications described elsewhere in this description. A remote application server computer (210) may for example comprise a web server. The one or more remote applications may be under control of one or more application providers.

A plurality of personal client computing devices (230) that may allow one or more users of the plurality of users (290) to remotely access the one or more remote applications and hence may also be referred to as access devices. A personal client computing device may also be referred to as a client computing device. A personal client computing device or client computing device or access device (230) may for example comprise a smartphone, a PC (personal computer), a laptop or a tablet computer, but also a smartwatch, a smart wristband, a smart keychain, a pair of smart glasses or another type of personal wearable computing device. A client computing device or access device (230) may be associated with a particular user, or with a small number of users (for example the members of a same household). A client computing device or access device (230) may have a mechanism for reserving the use of the access device to a specific single user or to a small set of specific users. For example, the access device may comprise a local authentication mechanism to locally authenticate one or more known users for the access device, e.g., by requiring a user to enter a password and verifying the provided password or by requiring the user to present a biometric and verifying the presented biometric.

A personal client computing device (230) may comprise one or more digital data processing components for processing digital data, such as for example a microprocessor or a CPU (Central Processing Unit); one or more memory components, such as for example a RAM (Random Access Memory) memory or a hard disk, for storing data or instructions (e.g., software such as an operating system like the Apple iOS or the Android operating systems, or such as various mobile applications or apps) to be performed by the digital data processing components. In some embodiments, the client computing device (230) may further comprise a user input interface (such as a touch screen or a keypad) and/or a user output interface (such as a display and/or a loudspeaker).

In some embodiments, the personal client computing device (230) may comprise a contextual data collecting component adapted to collect contextual data. The contextual data collecting component may comprise a number of hardware sensors such as a location sensor (such as a GPS sensor) for providing location data, a temperature sensor for providing temperatures measurements, a pressure sensor for providing pressure measurements, a magnetometer sensor for providing magnetic field measurements, an accelerometer for providing acceleration measurements, a microphone for providing sound measurements, etc. The contextual data collecting component may further comprise, for example, contextual data collecting software performed by the one or more data processing components comprised in the personal client computing device. The contextual data collecting component may be adapted to gather, for example at particular instances, contextual data provided by the hardware sensors or by the operating system of the personal client computing device (230) to assemble a collected contextual data set.

The personal client computing device may further comprise a contextual data anonymization component adapted to anonymize the collected contextual data, according to any of the anonymization methods described in more detail elsewhere in this description. For example, in some embodiments the contextual data anonymization component may comprise contextual data anonymization software that may be performed by the one or more data processing components comprised in the personal client computing device.

The contextual data collecting component and/or the a contextual data anonymization component may consist of or may comprise one or more appropriately programmed digital data processors or microcontrollers, or dedicated electronic hardware components such as one or more Application Specific Integrated Circuits (ASICs) or Field-Programmable Gate Arrays (FPGAs). The contextual data collecting component and the a contextual data anonymization component may be implemented on the same hardware platform or on a different hardware platform.

The personal client computing device (230) may further comprise a data communication interface such as a wireless data communication interface (such as for example a Wi-Fi interface or a Bluetooth interface), for exchanging data (such as the collected and anonymized contextual data) with for example a remote application server (210) or an authentication server (220).

A computer network (250) that connects the one or more application server computers (210) and the plurality of personal client computing devices or access devices (230). In some embodiments, the computer network (210) may comprise the internet. In some embodiments, the computer network (210) may comprise a public telephone network. In some embodiments, the computer network (210) may comprise a wireless telephony network.

One or more authentication servers (220). In some embodiments, each of the one or more authentication servers (220) may be connected to at least one of the one or more application servers (210) and may be configured to analyse anonymized contextual data that it may have received, directly or indirectly through one of the one or more application servers hosting a remote application, from one of the personal client computing devices (230) associated with one of the users (290) interacting with such remote application. In some embodiments, each of the application servers (210) may be connected to at least one of the one or more authentication servers (220) and may be configured to forward to one of the connected one or more authentication servers (220) anonymized contextual data received by a remote application hosted by the application server (210) from a personal client computing device associated with a user (290) who may be interacting (or who may try to interact) with the remote application. Upon receiving contextual data collected by a user's personal client computing device, either directly or indirectly through a remote application, an authentication server may process the received contextual data, for example to authenticate the user. In a typical embodiment, the contextual data collected by the user's personal client computing device and received by the authentication server may have been anonymized by the user's personal client computing device before the collected contextual data are transmitted (directly or indirectly) to the authentication server. In some embodiments, some or all of the received contextual data are anonymized by the authentication server after they have been received by the authentication server. The anonymization of the contextual data may happen according to any of the anonymization methods described in more detail elsewhere in this description.

After analysing the received contextual data, the authentication server (220) may inform the remote application server of the result of the analysis and the remote application may use that result to take appropriate action. For example, the authentication server (220) may return a signal to the remote application to indicate whether the authentication of the user was successful. If the signal indicates that the authentication was successful, the remote application may use that information to take appropriate action, for example in deciding whether or not to grant access to the user or whether or not to perform a certain operation requested by the user (such as performing a transaction submitted by the user).

A remote application server and/or an authentication server may comprise or may be comprised in one or more server computers which may in turn comprise: one or more digital data processing components for processing digital data, such as for example a microprocessor or a CPU (Central Processing Unit); one or more memory components for storing data or instructions (e.g., software) to be performed by the digital data processing components, like for example a RAM (Random Access Memory) memory or a hard disk, a network interface component, like an Ethernet interface, for connecting the remote application server to a computer network (250) like for example the internet. In some embodiments, the remote application server and the authentication server may be comprised in two different physical computers. In other embodiments, the remote application server and the authentication server may be comprised in the same physical computer. In some embodiments, the remote application server may comprise the authentication server.

The following paragraphs describe a particular set of embodiments of the invention. This particular set of embodiments may include an authentication system which may be referred to with the label 'ConSec'.

A context-aware authentication system should preferably be invisible to the authorized user, but requires collecting much private information about the user. Therefore, such a system can be perceived as invasive to the privacy of the user. Privacy concerns may exist in particular with respect to the GPS location coordinates of a user. Surveys were performed to study the behaviour of the user towards location data. A number of observations were made from such surveys. Firstly, it was found that a large number of users denied to give permission for smartphone apps to access their location data. Secondly, some users might be willing to grant an app access to the location while they are actively using the app, but they might be reluctant to do so if the app is in the background. Finally, some users who did not give permission to access location data indicated that they were concerned whether their location data would be kept safely or not and whether their location data would be shared with other parties.

A related concern from some users is what happens with their location data if these location data are stored on a server and that server is breached. One intuitive solution is to process all privacy sensitive data locally on the user's phone without transferring any privacy sensitive data to any server, but not all smartphones have the processing power to run the computationally intensive algorithms that may be used to process contextual data for authentication purposes and even if they do have the required processing power, this may have too negative an effect on the battery life of the user's smartphone. Further, the inventors have also observed from a data collection experiment that in general users are not keen to give permission to collect and log raw location data regardless of where these data are effectively stored.

Some of the embodiments described here comprise a context-aware authentication system that protects the confidentiality of location data by transforming the location data into a location-hash with an irreversible transformation using a locality-sensitive hashing technique. Such Location-hashes only reveal a relative measure of similarity between vectors of location related data without revealing the actual locations or even the actual distances between locations while still allowing to make reliable comparisons of relative degrees of similarity between different pairs of such location related data vectors. I.e., the values of the location-hashes do not give any information about the real distance in meters between the locations nor do they say anything about the individual locations. Consequently, the user does not have to worry about the confidentiality of the location data, as it is impossible to know the actual locations from the location-hashes that may be stored in a log for future usage by the authentication system. Since the confidentiality of the location data is well protected, the user can be more easily convinced to provide a static setting to always allow collecting the location data. The main advantage of using such a location-hash based transformation of location data is that the computability on the hashed data (in terms of comparing the similarity between different hashed data values) is preserved and hence machine learning algorithms can be applied on the data transformed in this way to learn and subsequently use authentication data models based on location.

Properties of Embodiments of ConSec Authentication Systems

Some properties of embodiments of ConSec authentication systems may include the following:

Location confidentiality: In ConSec authentication systems, the confidentiality of location data of the user may be protected by hashing the user's location data with a LSH (Locality-Sensitive-Hashing) algorithm (see further for a more detailed description of an LSH algorithm). The location data may comprise latitude, longitude, barometric altitude, noise level and earth's magnetic field strength and inclination angle. The transformed data may be referred to as a Location-hash. For maximum privacy, the transformation of the location data may also be salted with a random salt. The LSH parameters may be generated randomly.

Computability on hashed data: The transformation used by the ConSec authentication systems to transform computable location data into a Location-hash, also preserves computability of transformed location data to be used in user-authentication data models based on location related data. ConSec authentication systems are adapted to successfully use Location-hashes to learn user-authentication data models using a machine learning algorithm.

Fine-grained authentication: ConSec authentication systems may provide high accuracy location-based authentication, for example, by including a barometric altitude in the contextual data, as this value depends on the floor level in a building where the user is located. ConSec authentication systems may compute the barometric altitude using data from a pressure sensor which may be comprised in the user's smartphone.

Robustness against spoofing: ConSec authentication systems are robust against spoofing. The contextual location data that are used by ConSec authentication systems may include a multitude of information such as latitude, longitude, barometric altitude, noise level, Wi-Fi information, Bluetooth information and mobile network information, representing a user's context at a specific location. Therefore, spoofing ConSec location contextual data is hard since a coherent set of values for multiple data elements would have to be provided that also matches the normal patterns in the user's contextual data.

Figure 1A:
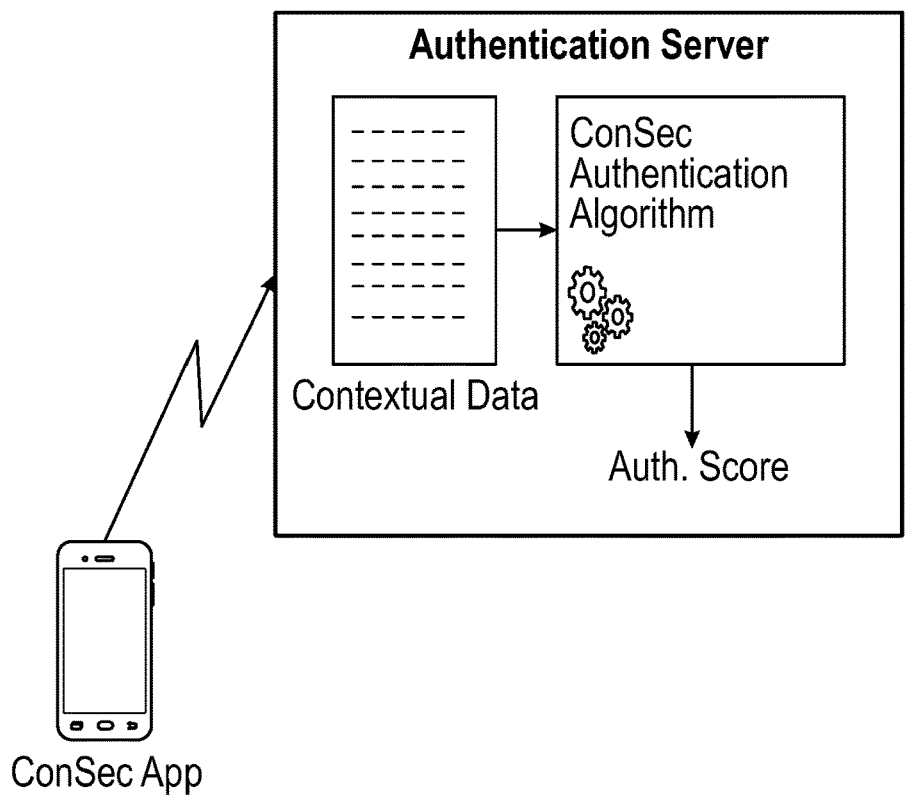
FIG. 1A and FIG. 1B schematically illustrate an exemplary system and application, respectively, according to an aspect of the invention.
Figure 1B:
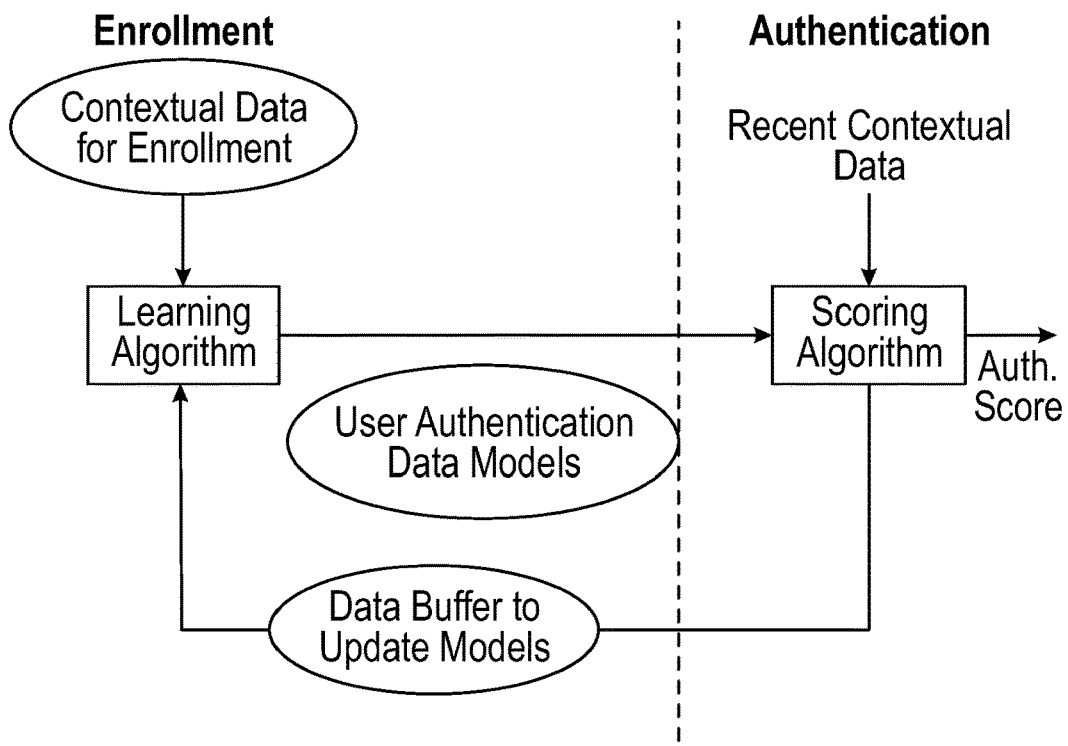

FIG. 1A and FIG. 1B schematically illustrate a particular set of embodiments of a system according to an aspect of the invention.

General Architecture of Embodiments of the ConSec Authentication System

FIG. 1A shows the block diagram of a ConSec context-aware authentication system, comprising an app, referred to as ConSec-App, running on a user's smartphone (or access device) and which may comprise a collection component for collection of contextual data, and the ConSec authentication application, referred to as ConSec-Auth, running on an authentication server. ConSec-Auth may be adapted to learn the user authentication data models from contextual data collected during an enrolment phase.

FIG. 1B shows the block diagram of the ConSec-Auth application, comprising an enrollment phase and an authentication phase. During the enrollment phase, which may for example last for about 4 weeks, the enrollment contextual data may be collected for a particular user. These enrollment contextual data may be used, e.g., by the ConSec-Auth application, to learn user authentication data models for that particular user. The learned user authentication data models may then be used, e.g., by the ConSec-Auth application, in the authentication phase to authenticate that user.

For a typical user, the contextual data tends to form clusters around certain locations more or less frequently visited by the user, such as home, work, shopping centers etc., according to that user's mobility pattern (in space and time) in their day-to-day life. Therefore, to sufficiently capture the user's mobility pattern, the contextual data need to be collected over sufficiently long a time period, for example over a couple of weeks. Hence, in some embodiments the contextual data collected over a period of about 4 weeks may be used for enrollment. In some embodiments, the user's contextual data may be collected during the enrollment phase on regular intervals, e.g., every 10 minutes.

In some embodiments, the collected enrollment contextual data of the user may be anonymized by transforming the values of the privacy sensitive data elements of the collected enrollment contextual data by means of a privacy preserving anonymization transformation. In some embodiments, at least some non-computable collected enrollment contextual data may be anonymized using an identity preserving anonymization transformation (such as any of the identity preserving anonymization transformations described elsewhere in this description). In some embodiments, this identity preserving anonymization transformation may be salted. In some embodiments, this identity preserving anonymization transformation may comprise a cryptographic hash function. In some embodiments, at least some computable collected enrollment contextual data may be anonymized using a similarity preserving anonymization transformation (such as any of the similarity preserving anonymization transformations described elsewhere in this description). In some embodiments, this similarity preserving anonymization transformation may be salted. In some embodiments, this similarity preserving anonymization transformation may comprise a location-sensitive hashing (LSH) algorithm. In some embodiments, this similarity preserving anonymization transformation may comprise a probabilistically similarity preserving anonymization transformation, such as for example the super-bit LSH (SB-LSH) algorithm discussed in more detail below.

Generating the Salt

The values of the salts used in salting the anonymization transformations may be generated for each user or for each user smartphone or access device separately. In some embodiments, they may be generated randomly, for example using a true random generator or a pseudo-random generator. In some embodiments, the salt values may be generated externally to the user's access device or smartphone and provided to the user's access device or smartphone for storage (e.g., in a non-volatile memory of the user's access device or smartphone) and usage by components of the authentication system on the user's access device or smartphone. This may have the advantage that, if the user has multiple access devices or replaces an access device with a new access device, the continuity in the transformation values of contextual data transformed by salted anonymization transformations may be maintained, for example if the salt generated salt values are also stored externally to the access device and can be accessed to be provided to another (additional or new) access device. In other embodiments, the salt values may be generated internally by a component (for example a component of the ConSec-App) comprised in the user's access device or smartphone and permanently stored in the user's access device or smartphone for subsequent usage by components of the authentication system on the user's access device or smartphone, without these salt values ever leaving the user's access device or smartphone. This may have the advantage that it may be much easier to guarantee the secrecy and confidentiality of the salt values. In some embodiments, the salt values are generated once, e.g., during an initialization phase prior to or at the beginning of the enrollment phase and may then be stored permanently in the user's access device or smartphone for subsequent usage, for example during the enrollment and authentication phases, by components of the authentication system on the user's access device or smartphone. In some embodiments, the values of the salts on a particular user's access device or smartphone may be re-initialized, for example, in case the existing salt values are deemed to have been compromised.

At the end of the enrollment phase, ConSec authentication systems may learn the user authentication data models from the anonymized collected enrollment contextual data, for example by using a machine learning algorithm. To learn the user authentication data models, ConSec authentication systems may compute a feature vector for every set or snapshot of the anonymized collected enrollment contextual data (whereby a set or snapshot of collected contextual data of a user, groups the contextual data of that user that have been collected at a particular moment in time). In some embodiments, the computed feature vector may comprise three feature sub-vectors: a first feature sub-vector computed from the (anonymized) location contextual data, a second feature sub-vector computed from the (anonymized) device contextual data, and a third feature sub-vector computed from the (anonymized) behavior contextual data. The user authentication data models may be learned from the computed feature vectors, for example by feeding the computed feature vectors to a machine learning algorithm.

As will be described in more detail further on, the location contextual data may include for example data provided by a GPS sensor in the user's smartphone, or data about the Wi-Fi access points, Bluetooth devices and phone network that are visible to the user's smartphone. The device contextual data may include for example data representing: the IMEI, IMSI, device model name and applications installed in the phone. The behavior contextual data may include for example data representing: apps used by the user, apps usage duration, phone call pattern and phone call duration.

Once the user authentication data models have been learned or generated, ConSec authentication systems may use these learned user authentication data models to authenticate the user during the authentication phase. In some embodiments, a component of the ConSec authentication systems, for example the ConSec-App, may, during the authentication phase, collect one or more sets or snapshots of recent contextual data for the user. These one or more sets of collected recent contextual data may be anonymized, for example by the ConSec-App. This anonymization of the one or more sets of collected recent contextual data may for example be done in the same way as the enrollment contextual data mentioned above. The one or more sets of anonymized collected recent contextual data may be transmitted, for example by the user's smartphone or access device, to an authentication server, for example the ConSec-Auth application, which may match the received anonymized recent contextual data against the user authentication data models.

To match the contextual data, feature vectors may be computed in exactly the same way as during the learning phase and the computed feature vectors may be matched with the learned user authentication data models. In some embodiments, the feature vectors may be computed, for example by the authentication server, after the transfer of the anonymized collected recent contextual data to the authentication server. In other embodiments, the feature vectors may be computed, for example on the user's smartphone or access device, before said transfer, for example as part of the anonymization process.

In some embodiments, the result of the matching operation may comprise or may represent the degree (according to some criterion) that the computed feature vectors match with the learned user authentication data models. In some embodiments, the result of the matching operation may be represented in an authentication score. The authentication score may be considered a measure of the probability or likelihood that the current user of the user's smartphone or access device is indeed the same as the legitimate enrolled user. For example, in some embodiments a poor match between the computed feature vectors and the learned user authentication data models may be interpreted as a low authentication score (i.e., a low probability or likelihood that the current user of the user's smartphone or access device is indeed the same as the legitimate enrolled user), whereas a good match may be interpreted as a high authentication score (i.e., a high probability or likelihood that the current user of the user's smartphone or access device is indeed the same as the legitimate enrolled user). The result of the matching operation, such as the authentication score, may be used by a remotely accessible application to take appropriate action, for example by using this result in a decision process, for example to decide whether to login the user, or whether to give or continue to give the user access to certain resources, or whether to accept or perform certain transactions which may be submitted or requested by the user.

Contextual Data

The following paragraphs provide a brief description of the different types of the contextual data that may be collected for a particular user. The various contextual data elements may be grouped in three categories: location data, device information and behavioural information.

Location Data

Location data are the contextual data related to the location of the user. The location related contextual data may comprise computable location data and non-computable location data Computable Location Data In some embodiments, the computable location data may consist of the latitude, longitude, horizontal accuracy, barometric altitude, sound and magnetic fingerprint. More details about these various computable location data elements are given below.

Anonymizing the Computable Location Data by Creating a Location-Hash

In some embodiments, the computable location data may be anonymized by transforming the computable location data by means of a similarity preserving anonymization transformation. In some embodiments, this similarity preserving anonymization transformation may comprise applying a hashing algorithm like the LSH hashing algorithm on the set of computable location to create a so-called Location-hash, as explained in more details in some of the paragraphs below.

Geographic Location

The geographic location may be represented by a three-dimensional vector wherein the X, Y and Z coordinates may indicate the geographic location on earth in, for example, the ECEF (Earth-Center-Earth-Fixed) coordinates system. The three-dimensional geographical location vector may be computed as follows from the latitude and longitude information of the user (or rather the user's smartphone) which may be given for example by a location sensor (such as a GPS sensor) comprised in the user's smartphone.

In some embodiments, the geographic latitude ($\phi$) and longitude ($\lambda$) values may be transformed into X, Y and Z values in, for example, the Earth-Center-Earth-Fixed (ECEF) Cartesian co-ordinate system. The WGS84 (World Geodetic System 84) earth model may be used to model the earth's surface as an ellipsoid. The following formula may be used to transform the latitude ($\theta$) and longitude ($\phi$) values into the ECEF coordinate system:

$$\begin{pmatrix} p_x \\ p_y \\ p_z \end{pmatrix} = \begin{pmatrix} (N+h)\cos(\phi)\cos(\lambda) \\ (N+h)\cos(\phi)\sin(\lambda) \\ ((b^2/a^2)N+h)\sin(\phi) \end{pmatrix}$$

wherein h is the altitude (as may be provided by a GPS sensor of the user's access device) and wherein the radius of curvature in the prime vertical (N) is defined by the equation:

$$N = \frac{a}{\sqrt{(1 - e^2 \sin^2(\phi))}}$$

In these equations, the first eccentricity squared ($e^2$), the semi-major axis (a) and the semi-minor axis (b) may be taken from WGS84: $e^2 = 6.69437999014 \times 10^{-3}$, a=6378137 m and b=6356752.3142 m.

Figure 3:
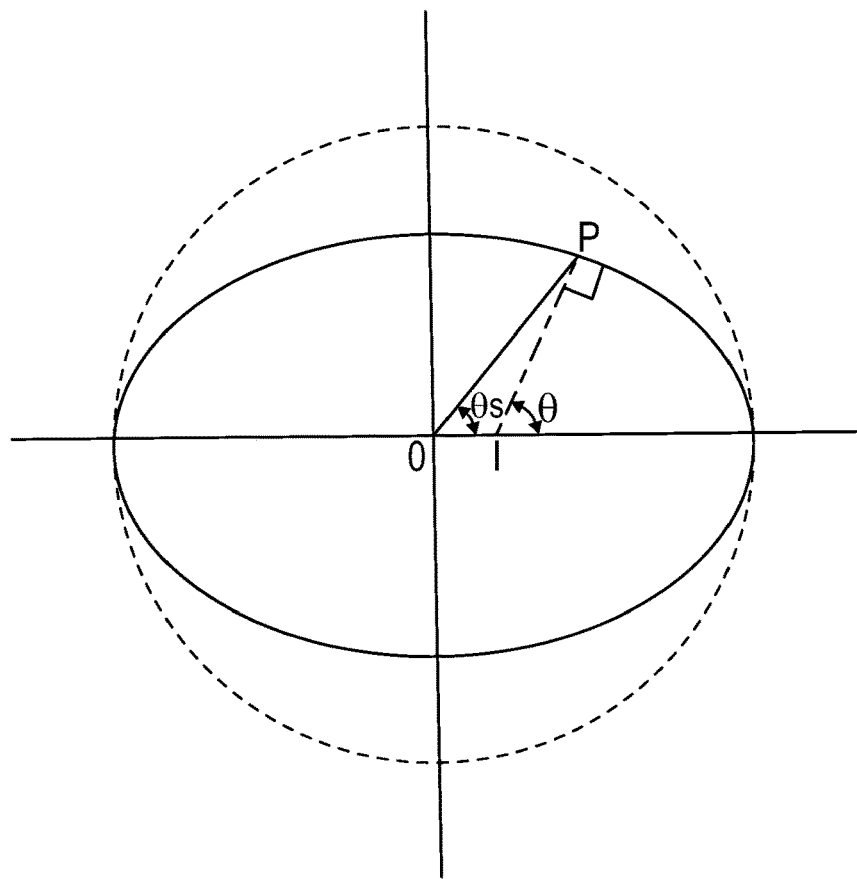
FIG. 3 schematically illustrates the relation between geodetic latitude and geocentric latitude as used in one embodiment of a system according to an aspect of the invention.

The latitude and longitude values recorded by the GPS sensor are geographic or geodetic coordinates. The geodetic latitude is determined by the angle between the equatorial plane and normal to the ellipsoid (the angle made by line PI with the earth's major axis as shown in FIG. 3: Geodetic latitude ($\theta$) and Geocentric latitude ($\theta$s)). Therefore, latitude values over the earth's surface intersects major axis at different place and are not directly comparable. To be able to compare two latitude values, the geodetic latitude values may be converted with respect to the earth's center (angle made by point P with line PO with respect to major axis and passing though the center of earth). The WGS84 ellipsoid model may be used to model the earth's surface as ellipsoid. Hence, the ECEF coordinate system may be used, so that the latitude values can be used for computation.

In other embodiments other methods may be used to transform the GPS coordinates into a vector in a 3-dimensional, preferably orthonormal, co-ordinate system which may be preferably fixed or commoving with the earth.

An alternative source for geographic location data may be based on the triangulation of mobile network base stations (e.g., if a measure of the distance of the user's smartphone to a number of mobile network base stations with a known position may be available).

Horizontal Location Accuracy

In some embodiments, the horizontal accuracy of the user location may be available from the location sensor.

Barometric Altitude

The barometric altitude may be derived from a barometric pressure measurement provided by a pressure sensor, which may be comprised in the user's smartphone or access device. The barometric pressure may provide valuable contextual information about the user's location since it may be used as an indication of the height above sea level of the user's location. Such a barometric altitude has the advantage that, unlike the GPS altitude, it can also be measured inside a building. The data from the pressure sensor may be used to compute the barometric altitude, since the atmospheric pressure drops with the altitude. The barometric altitude H may be calculated from the measured pressure (p) provided by the pressure sensor and the reference pressure ($p_0$) and temperature ($T_0$), for example, using the formula:

$$H = \frac{273.15 + T_0}{0.0065} \left(1 - \left(\frac{p}{p_0}\right)^{\frac{1}{5.255}}\right)$$

The reference pressure ($p_0$) and temperature ($T_0$) may be queried from an online weather station, preferably the weather station nearest to the actual location of the user's smartphone or access device. For example, in one embodiment data from the OpenWeatherMap weather station (https://openweathermap.org/) may be used. The frequency with which the reference pressure ($p_0$) and temperature ($T_0$) may be queried may vary from one embodiment to another. For example, in some embodiments these values may be queried a fixed number of times (e.g., four times) per day. In other embodiments, these values may be queried each time a new barometric altitude value is derived. In some embodiments the value for the barometric altitude H is only updated if the reference pressure ($p_0$) and temperature ($T_0$) can be queried.

Noise/Sound

The average amplitude of the background noise may be used as the contextual data. The audio data may be read from a microphone comprised in the user's smartphone and the maximum amplitude may be recorded as the amplitude of the background noise. The noise information provides information about the user location. Some locations may have specific average noise characteristics. For example, an office is likely to have different noise characteristics than a supermarket.

Magnetic Fingerprint

The magnetic fingerprint of the user location may be computed using data from a magnetometer sensor and an accelerometer sensor which may be comprised in the user's smartphone. The earth's magnetic field strength and magnetic inclination angle may be collected as the contextual data. These data are unique on earth's surface and hence provide valuable information about the user's location.

Magnetic field strength: The magnetic field varies in strength over the earth's surface. It is strongest at the poles and weakest at the equator. The magnitude is computed from the magnetic field in x-, y- and z-directions: $\sqrt{m_x^2+m_y^2+m_z^2}$ Magnetic inclination angle: The magnetic inclination angle is the angle at which the magnetic field lines intersect the surface of the earth. This angle ranges from 0 degrees at the equator to 90 degrees at the poles.

Figure 4:
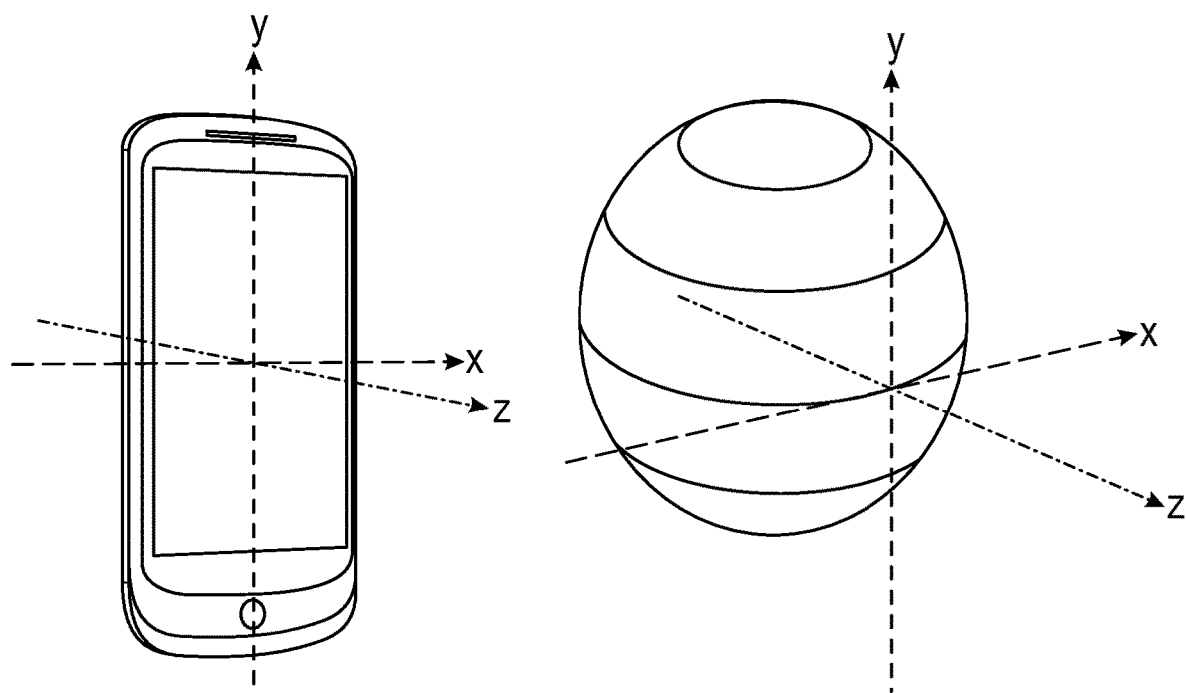
FIG. 4 schematically illustrates the alignment of a coordinate system of a user's access device and a world coordinate system, in one embodiment of a system according to an aspect of the invention.

To compute the magnetic inclination angle correctly from the magnetic field sensor data, the sensor coordinates need to be aligned with respect to the world coordinate system (i.e. coordinate space as gravity). The three axes of magnetic field sensor is aligned with the device coordinate when the device is held in default orientation shown in left in FIG. 4. The accelerometer data may be used to compute the device orientation and the matrix for data transformation with respect to world coordinate. The accelerometer data measures the force due to earth's gravitational force, when the device is not accelerating or moving (with respect to the earth). Therefore, the accelerometer data without device acceleration needs to be used to compute the device orientation. The magnitude of the accelerometer data ($\sqrt{a_x^2+a_y^2+a_z^2}$) has a value that is around g=9.8 m/sec2, when the user's access device is not accelerating (relative to the earth). An accelerometer data sample with a magnitude around this value, is likely to correspond to a situation wherein the device is not accelerating with respect to the earth and may be used to compute the device orientation. A matrix (T) that transforms the acceleration data vector such that it has an acceleration component only in the z-direction and zero acceleration in the x- and y-directions may be computed. The measured magnetic field vector ($\vec{f}$) may then be transformed as follows:

$$\vec{m}=T*\vec{f}$$

The magnetic inclination angle may then be computed from the horizontal magnitude and the z-component of the transformed magnetic field vector:

$$\text{magnetic inclination}=\operatorname{atan}\left(\frac{m_z}{\sqrt{m_x^2+m_y^2}}\right)$$

Wi-Fi Information

Various data elements related to the Wi-Fi environment of the user's smartphone or access device (as mentioned below) may be collected as contextual data.

Wi-Fi router name: The name of the Wi-Fi router the mobile is connected to.

Wi-Fi router MAC: The MAC address of the Wi-Fi router the mobile is connected to.

Wi-Fi Received Signal Strength (RSSI): The received signal strength of the Wi-Fi router the mobile is connected to.

Wi-Fi router IP: The IP address of the Wi-Fi router the mobile is connected to.

Wi-Fi network ID: The network ID of the Wi-Fi router the mobile is connected to.

Wi-Fi DNS1: The primary DNS (Domain Name System) settings in the Wi-Fi router the mobile is connected to.

Wi-Fi DNS2: The secondary DNS settings in the Wi-Fi router the mobile is connected to.

List of scanned Wi-Fi names: The list of Wi-Fi names that are available.

List of scanned Wi-Fi MACs (Media Access Control): The list of Wi-Fi MACs that are available.

List of received signal strength of scanned Wi-Fi's: A list with the received signal strengths of the Wi-Fi networks that are present.

Phone Network Information

Mobile network type: The mobile network type. E.g. 2G, 3G, 4G, LTE.

Mobile network signal strength: The received signal strength.

Mobile network operator name: The name of the mobile network operator.

Mobile network MCC and MNC: The mobile operator MCC (Mobile Country Code) and MNC (Mobile Network Code).

Mobile network LAC: The LAC (Location Area Code) of the mobile operator at the current location.

Mobile network cell ID: The mobile network cell id of the current location from the mobile operator. The mobile operator may divide the city over several hexagonal GSM cells. A BTS (Base-Transmission-station) station provides a radio link to the mobile phone. Each GSM cell has a unique id assigned to it.

Bluetooth Information

List of Bluetooth paired device names: The list of Bluetooth device names that are available.

List of Bluetooth paired device MACs: The list of Bluetooth device MAC address that are available.

Time

In general, a user's contextual data may be expected to have time-related patterns. For example, there may be some periodic correlations in a user's contextual data. These time-related patterns may be detected by including the time as a contextual data element in the analysis of the contextual data. To facilitate such an analysis one or more time values modulo one or more typical periodicities may be included in the contextual data. Typical periodicities over which an average user's contextual data may show a pattern may for example be: a year (the user may have seasonally dependent habits that may recur over the years: such as a holiday abroad in more or less the same period of year), a month, a week (e.g., a user's contextual data sets from days in the workweek may be clearly distinguishable from contextual data sets in the weekend), or a day (a user may for example be rather regular in the times of day to get up in the morning, to take a break to have dinner, to drive home from the office, to go to sleep, . . . ).

Time stamp day index: Week day index from the time stamp of contextual data. For example, 0=Monday and 6=Sunday (i.e., the time in rounded units of days modulo 7 days).

Time stamp in seconds: Time in seconds since mid-night of the same day (i.e., the time in seconds module 24 hours).

Device Information

SIM Serial: The 19-digits serial number of the SIM card.

IMEI: The IMEI (International Mobile Equipment Identity) number of the mobile hardware.

IMSI: The IMSI (International Mobile Subscriber Identity) of the mobile number. The mobile network operator uses this information to identify the SIM user.

Phone type: The type of phone: GSM or CDMA.

Wi-Fi configured names: The list of pre-configured Wi-Fi names.

Wi-Fi Configured MAC: The list of pre-configured Wi-Fi MACs.

Bluetooth name: The Bluetooth name.

Bluetooth MAC: The Bluetooth MAC address.

Bluetooth paired devices: The list of paired Bluetooth device names.

Bluetooth paired devices MAC: The list of paired Bluetooth device MACs.

App system installed: Apps installed in the phone image.

Device name: The manufacturer device name of the mobile device.

Device model: The model name of the mobile device from manufacturer.

Device product: The name of overall product from the manufacturer.

Device brand: The brand name of the mobile device.

Device board: The name of the underlying motherboard or processor board used in mobile device.

Device manufacturer: The manufacturer of the mobile hardware.

Device serial number: The mobile device serial number.

Device hardware configuration: A string representing the configuration of the device. The string may be composed of: the name of the sensors present in the user's smartphone or access device (e.g. accelerometer, gyroscope etc.), screen size in inch and pixels and security configuration (whether PIN or Password enabled by the user).

Behavioural Information

Apps user installed: The list of apps installed by the user on the user's smartphone.

Apps used names: The list of the names of apps used by the user. The names of apps used in the last 24 hours, 12 hours, 6 hours and 3 hours and 1 hour may be collected.

Apps used total duration: The duration of the usage of apps used by the user may be collected. The usage duration of apps used in the last 24 hours, 12 hours, 6 hours and 3 hours and 1 hour may be collected.

Outgoing numbers: The list of outgoing numbers and corresponding names in the contact list called by the user in the last 24 hours, 12 hours, 6 hours and 3 hours and 1 hour.

Outgoing duration: The total duration of outgoing phone calls made by the user in the last 24 hours, 12 hours, 6 hours and 3 hours and 1 hour.

Incoming numbers: The list of incoming numbers and corresponding names in the contact list received by the user in the last 24 hours, 12 hours, 6 hours and 3 hours and 1 hour.

Incoming duration: The total duration of incoming call received by the user in the last 24 hours, 12 hours, 6 hours and 3 hours and 1 hour.

Wi-Fi data transmitted volume: The amount of data transmitted through Wi-Fi for the user in the last 24 hours, 12 hours, 6 hours and 3 hours and 1 hour.

Wi-Fi data received volume: The amount of data received through Wi-Fi for the user in last 24 hours, 12 hours, 6 hours and 3 hours and 1 hour.

Mobile data transmitted volume: The amount of data transmitted through a mobile network for the user in the last 24 hours, 12 hours, 6 hours and 3 hours and 1 hour.

Mobile data received volume: The amount of data received through a mobile network for the user in the last 24 hours, 12 hours, 6 hours and 3 hours and 1 hour.

Number of times phone unlocked: The number of times the user's smartphone has been unlocked by the user in the last 24 hours, 12 hours, 6 hours and 3 hours and 1 hour.

Enhancing the Privacy of the Contextual Data

The contextual data may be anonymized, for example by transforming at least some of the contextual data using a type of hashing algorithm, to enhance the privacy of the user. The contextual data may contain a mixture of computable (e.g. latitude, longitude, barometric altitude etc.) and non-computable data (e.g. Wi-Fi names, Wi-Fi MAC addresses etc.). Preserving computability on the transformed data (for example to be able to compare different values in a meaningful way) may be important for computable data such that the authentication system may be able to analyse the transformed contextual data in order to learn authentication data models, for example, using a machine learning algorithm. For this reason, it may be advantageous to anonymize at least some computable data element values using a similarity preserving anonymization transformation.

The following paragraphs describe how the computable and non-computable contextual data may be anonymized.

Computable Data

A similarity preserving anonymization transformation, such as the locality-sensitive-hashing (LSH) algorithm may be used to transform or hash (all or some of) the computable contextual data values, for example the location contextual data. The transformed data values resulting from applying a locality-sensitive-hashing (LSH) algorithm to location data may be referred to as a location-hash. Since the location data (e.g. the geographic location) carry privacy sensitive information about the user, the location data may be transformed into a location-hash to enhance the privacy. Some computable contextual data such as the data volume received and transmitted, the app usage duration and the call duration may in some embodiments be considered as not containing privacy sensitive information, and hence in some embodiments no specific transformation of these data is required, i.e., these data may in such embodiments be incorporated into the anonymized data without having been hashed (or otherwise transformed in an irreversible way). The location-hash may be computed from location data comprising the geographic location, the barometric altitude, the noise level, the magnetic field strength and the magnetic inclination angle.

LSH algorithms can be broadly grouped into two main categories: data independent algorithms and data dependent algorithms. The LSH algorithms in the first category (data independent LSH algorithms) generate the LSH function parameters randomly and independently from the data, whereas the algorithms in the second category (data dependent LSH algorithms) learn LSH function parameters from the data. The super-bit LSH (SB-LSH) algorithm (see: J. Ji, J. Li, S. Yan, B. Zhang, and Q. Tian, "Super-bit locality-sensitive hashing," in *Advances in Neural Information Processing Systems*, 2012, pp. 108-116.) from the first category may be used in some embodiments. It has the following advantages. The LSH function parameters can be generated randomly for each user and hence provide much randomness on the computed location-hash values. If the LSH function parameters are compromised for a particular user, a new set of LSH function parameters can be generated for that user and the authentication system can be re-initialized as well. Lastly, the methods in the first category (data independent LSH algorithms) are computationally more efficient and are more suitable for computationally limited devices such as smartphones, while the methods in the second category (data dependent LSH algorithms) require complex machine learning algorithms to learn the LSH parameters.

During an initialization phase, which may for example happen prior to or at the beginning of the enrolment phase, initialization values for some parameters of the SB-LSH algorithm may be determined. These parameter values may include the values for $D_{salt}$ components $s_i$ of a salt vector of dimensionality $D_{salt}$, and the values of a set of K LSH-vectors $v_i$: $[v_1, v_2, \ldots, v_K]$ (which may also be referred to as LSH functions). K, a positive integer indicating the number of LSH-vectors, and $D_{salt}$, a positive integer indicating the number of components of the salt vector, are parameters of the SB-LSH algorithm the values of which have to be chosen. The dimensionality $D_{lshv}$ of the K LSH-vectors $v_i$ may be chosen to be equal to the sum of the dimensionality $D_{oldv}$ of the original data vector to be transformed and the dimensionality $D_{salt}$ of the salt vector, i.e., $D_{lshv} = D_{oldv} + D_{salt}$. The values of these parameters (i.e. the values of the salt vector and of the K LSH vectors or LSH functions) may be initialized once per user (and then permanently stored) with values that may be randomly generated (for example by a true random generator or a pseudo-random generator). This generation of the initialization values may in some embodiments happen on the user's access device or smartphone. In some embodiments the values of the K LSH-vectors $v_i$ may be sampled from the normal distribution N(0,1), and the K LSH-vectors $v_i$ may further be orthogonalized (in groups of at most $D_{lshv}$ vectors) using for example the Gram-Schmidt process.

After the initialization phase, for example during the enrolment phase or during the authentication phase, a location data set may be anonymized by transforming the location data set into a location-hash using the SB-LSH algorithm as follows.

In some embodiments, an original location data vector may be generated by combining in a single vector the collected values of a set of various location data elements. For example, in some embodiment the original location data vector may comprise a 3-dimensional geographic location vector, and 1-dimensional barometric altitude, noise level, magnetic field strength and magnetic inclination angle values. Then, a salted location data vector may be generated by extending the original location data vector with the salt vector mentioned above. This salting contributes to the anonymization effect achieved by the overall transformation. By construction, the dimensionality of the salted location data vector is equal to the dimensionality of each of the K LSH vectors $v_i$ (see the description above of the generation of the LSH vectors). With the above given example of a 7-dimensional original location data vector and with a 3-dimensional salt vector, both the salted location data vector and the K LSH-vectors $v_i$ will be 10-dimensional.

The salted location data vector (x) may then be projected on each of the K LSH vectors $v_i$ to compute the location-hash. The projection of the salted location data vector (x) on each of the K LSH vectors $v_i$ may be computed as the one-bit values $h_{v_i}(x) = \text{sgn}(v_i^T x)$, where sgn(.) is defined as:

$$\text{sgn}(z) = 0, z \geq 0$$
$$= 1, z < 0$$

By concatenating the K one-bit $h_{v_i}(x)$ values, this results in the following K-bits location-hash value:

$$h(x) = h_{v_1}(x), h_{v_2}(x), \ldots, h_{v_K}(x).$$

The SB-LSH algorithm has the property that the angular distance between two different original location data vectors can be computed from the hamming distance between the corresponding location-hash values. It can be shown that the expected value of the hamming distance between the location-hash values of two location vectors a and b is proportional to the true angular distance θ between these two location vectors:

$$E[d_{hamming}(h(a), h(b))] = \frac{K\theta}{\pi} = C\theta$$

where $C = K/\pi$ is a constant. Hence, the angular distance between the original location vectors can be computed (or estimated in a probabilistic sense) from the corresponding location-hashes. I.e., the anonymization transformation of the location data values based on the SB-LSH algorithm is an example of a (probabilistically) similarity preserving anonymization transformation.

The K randomly generated LSH vectors or functions are used to compute the location-hash. The question may arise as to the preferred value of the parameter K. This value depends on the security strength and the accuracy that is needed in computing the distance between different original location data vectors from the corresponding location-hash values. In both cases, a large value of K is desired. On the other hand, a large value of K increases the amount of the data that needs to be transmitted and stored on the server. A value of K that gives a reasonable error in computing the distance and that is also not too small from a security point of view, is preferred. An experiment was performed to statistically test the maximum error on computing the distance from the location-hash for different values of K. A large number of different location values (i.e. latitude and longitude) were generated randomly. The mean-square-error (mse) was computed between on the one hand the true angular distances computed from actual location values and on the other hand the angular distance obtained from the corresponding location-hash values. From such an experiment it can be observed that an accuracy on the distance of approximately 500 meters can be achieved with K=4000. Also, the length of the hash with K=4000 is reasonably high from the security point of view. It can be further observed that the mean-square-error drops ever more slowly for K values larger than 4000. Therefore in some embodiments a value K=4000 may be chosen. In some embodiments, a K value may be chosen that is larger than 2000 and smaller than 8000. In other embodiments, a K value may be chosen that is larger than 3000 and smaller than 6000.

Non-Computable Data

The non-computable data may be transformed using an identity preserving anonymization transformation. The identity preserving anonymization transformation may be hashed, e.g., using a cryptographic hashing algorithm. The identity preserving anonymization transformation may, for example, comprise applying a keyed hash algorithm to the data to be transformed. For example, in some embodiments the HMAC-SHA256 (Hashed Message Authentication Code-Secure Hash Algorithm 256) algorithm may be used to compute the transformed data value as follows:

Hash=HMAC(data,secret key+data name)

The "secret key" may have length of 128 bits and it may comprise or may be derived from a salt. This salt may have been generated, for example, during an initialization phase which may happen prior to or at the beginning of the enrolment phase. Such a salt may have been generated randomly for every user and may be permanently stored by the ConSec App on the user's smartphone. The generation of such a salt may have happened on the user's smartphone. The "data name" is the name of the contextual data element being hashed and "data" is the value of that contextual data element that is being hashed. For example, for the Device name contextual data element mentioned above, the data name is "Device_Name" as may be defined in the source code of an embodiment of the ConSec App.

Learning Authentication Data Models

The following paragraphs give more details about how the user authentication data models for a particular user may be learned from the anonymized contextual data. Learning the user authentication data models may comprise the following two steps: a first feature extraction step, and a second step in which a machine learning algorithm may be applied to compute the inferencing models or the user authentication data models.

The Feature Extraction Step

The feature vector is computed from each snapshot of the contextual data. Feature sub-vectors computed from the location, the device and the behaviour contextual data may be concatenated to form a feature vector. Table 1, Table 2 and Table 3 list the various contextual data elements and their feature type for the location, device and behaviour contextual data respectively. In some embodiments, the feature vector may be computed by determining the feature vector components as numerical values that are a function of one or more values of various data elements in the snapshot of the contextual data. Different methods for determining the numerical values of different feature vector components may be used, for example depending on the type of the contextual data element or elements that are used to determine the numerical values of the respective feature vector components. Some examples of such methods are discussed in the following paragraphs.

Cosine distance: In some embodiments, the location-hash data itself are not used for the computation. The location-hash data may be pre-processed to compute the feature vector components associated with the location-hash data. A number of cosine distance similarity values may be computed with respect to a number of reference location-hashes in order to compute a feature vector. The number of location-hashes that are selected as the reference location-hashes may be the same as the dimension of the location data from the training/enrolment data. The reference location-hashes may be computed once during the enrolment phase, e.g., using the location-hashes obtained during the enrolment phase, for example by applying a clustering algorithm on the location-hashes obtained during the enrolment phase. The mode of the location-hashes from the training samples are used as the reference. For example, the most frequently occurring location-hashes may be used as the reference location-hashes.

Value (V): The feature type indicated with "V" uses the value from the contextual data element directly.

Summed Value (SV): The feature type indicated with SV is computed by summing a set of values of the data element.

For non-computable data, a dictionary may be created to map non-computable data values to a numerical value to enable computation. In such a dictionary, a numeric value may be associated with each non-computable data value entry in the dictionary. The different feature types for non-computable data are:

Dictionary value (DV): The numeric value in the dictionary is used.

Mean dictionary value (MDV): For contextual data consisting of a list of non-computable data values, the feature value may be computed by computing the mean of the numeric values associated in the dictionary with the non-computable data values in the list.

One-hot-encoded (OHE): One-hot-encoded feature may be used to encode non-computable data. It can also be referred to as one-of-K scheme. The output will be a sparse matrix where each column corresponds to one possible value of one feature. Each column may correspond to a value that has been encountered during the enrolment phase. For example, to compute an OHE feature value for the "List of scanned Wi-Fi names" data element, an OHE model is fitted with the Wi-Fi names present in the enrolment data. If there are 4 different possible Wi-Fi names that occur, the feature output will have 4 columns, with one column for each name. Some example features are given in Table 1.

TABLE 1

| OHE features | | | | |
|---|---|---|---|---|
| | VascoGuest | VascoMobile | VascoTest | VascoWLAN |
| ['VascoGuest', 'VascoTest'] | 1 | 0 | 1 | 0 |
| ['VascoMobile'] | 0 | 1 | 0 | 0 |

Similarly for "Wi-Fi state" having value ON or OFF, the features value is:

| | ON | OFF |
|---|---|---|
| ON | 1 | 0 |
| OFF | 0 | 1 |

TABLE 2

| Location features | |
|---|---|
| Context data | Feature Type |
| Location-hash | cosine distance |
| Wi-Fi state | Value (on/off) |
| Wi-Fi Router Mac | DV |
| Wi-Fi Name | DV |
| Wi-Fi assigned IP | DV |
| Wi-Fi network ID | DV |
| Wi-Fi RSSI | value |
| Wi-Fi Frequency | DV |
| Wi-Fi router IP | DV |
| Wi-Fi DNS1 | DV |
| Wi-Fi DNS2 | DV |
| List of Wi-Fi Names | MDV |
| List of Wi-Fi MAC | MDV |
| SIM state | OHE |
| Network data state | OHE |
| Network data type | DV |
| Network RSSI | value |
| Network operator name | DV |
| Network MCC and MNC | DV |
| Network LAC | DV |
| Network cell ID | DV |
| List of Bluetooth devices connected | MDV |
| Day index | Value (0 = Monday . . . 6 = Sunday) |
| Time | Value (time in seconds since midnight) |

TABLE 3

Device features

| Context Data | Feature type |
|---|---|
| SIM serial | DV |
| IMEI | DV |
| IMSI | DV |
| Phone type | DV |
| List of configured Wi-Fi names | MDV |
| List of configured Wi-Fi MACs | MDV |
| List of configured Wi-Fi network IDs | MDV |
| Bluetooth name | DV |
| Bluetooth MAC | DV |
| Bluetooth paired device names | MDV |
| Bluetooth paired device MACs | MDV |
| Apps system installed | MDV |
| Device name | DV |
| Device model | DV |
| Device Product | DV |
| Device OS name | DV |
| Device brand name | DV |
| Device board | DV |
| Device manufacturer | DV |
| Device serial | DV |

TABLE 4

Behavior features

| Context Data | Feature type |
|---|---|
| Apps user installed | MDV |
| Apps used names | MDV |
| Apps used total duration | SV |
| Apps used names | MDV |
| Apps used total duration | SV |
| Outgoing numbers | MDV |
| Outgoing duration | SV |
| Incoming numbers | MDV |
| Incoming duration | SV |
| Wi-Fi data transmitted volume | V |
| Wi-Fi data received volume | V |
| Mobile data transmitted volume | V |
| Wi-Fi data received volume | V |
| Number of times phone unlocked | V |

Once the feature vectors have been computed, they may be standardized to zero mean and unit variance. This may have the advantage that the various feature vector components may all have the same weight.

Learning the User Authentication Data Models

In various embodiments, the machine learning algorithms used for learning the user authentication data models may for example be selected from the unsupervised (clustering) and supervised (classifier) categories of machine learning algorithms. The algorithms selected from the clustering category may comprise Kmeans and Self Organizing Maps (SOM). The algorithms selected from the classifier category may comprise SVM, Random Forest (RF) and Multi-layer Perceptron Neural Network (MLP). The implementation of SVM, RF and MLP algorithms from the scikit-learn software package may be used. The grid search may be performed to use the appropriate settings for these algorithms. The algorithms in the classifier category also need a set of negative training samples. In some embodiments the contextual data from a number (e.g., four) randomly selected users may be used as the negative samples.

For the clustering algorithms, the number of clusters for Kmeans and the number of neurons for SOM needs to be specified. The size of cluster and neurons may also be computed from the information from the histogram of location hashes. For example, the cumulative histogram of the location-hashes may be computed. The number of bins of the location-hashes that gives the cumulative histogram of more than 0.8 may be selected as the size of the cluster or the number of the neurons. For both algorithms, the maximum number of clusters may also be limited to 25.

User Authentication

Once the user authentication data models have been computed, ConSec is ready for authentication. To authenticate the user, a snapshot or set of contextual data may be collected on the user's smartphone, anonymized and sent to the authentication server. Subsequently, a corresponding feature vector (f) may be computed and standardized, exactly as before during the learning. The feature vector may then be compared to the authentication data models which may have been obtained during the enrolment phase (and which may have been updated one or more times since then). An authentication score may be computed from the degree that the feature vector matches the authentication data models.

For the clustering approach, the smallest Euclidean distance (d) with respect to data models may be computed as the degree that the feature vector matches the clusters that make up the authentication data models (whereby $u_k$ may represent the centre of cluster k):

$$d = \min_{k} \|u_k - f\|$$

The authentication score may be computed as:

Score=1−d

The authentication score is bounded (between [0, 1]), if the feature vectors have been normalized.

For the classifier approach, "predict_proba" functions provided by the algorithm may be used to determine the value of the authentication score. This basically computes distance with respect to the decision boundary.

Updating the Learned User Authentication Data Models

The contextual data may comprise both static and non-static information. The non-static information can change over time and therefore it may be advantageous to update the user authentication data models at more or less regular time intervals. For example, the list of Wi-Fi routers at certain locations can change in time, whereby some Wi-Fi routers can disappear and new ones can appear. Therefore, user authentication data models may have to be updated at regular intervals. In some embodiments, a weekly interval may be chosen as a default update time interval. The contextual data collected in that interval may be used to compute the updated user authentication data models. In some embodiments, the contextual data collected in that interval may be used to compute the updated user authentication data models if the contextual data in the week were predicted with the higher accuracy. In some embodiments, some or all of the contextual data collected in a time interval preceding the moment of computing the updated user authentication data models may be used to compute the updated user authentication data models. In some embodiments the length of that time interval may be fixed, e.g., a day, two days, a week, two weeks, a month, . . . . In some embodiments this time interval may coincide with the time interval between the current update and the previous update. In some embodiments, some or all of the contextual data collected in a time interval preceding the moment of computing the updated user authentication data models may be used to compute the updated user authentication data models if a certain condition is satisfied. For example, in some embodiments the contextual data collected in such a time interval may be used if the average authentication score in that time interval has exceeded a certain first threshold value. In some embodiments, those sets of contextual data are used for which the corresponding authentication score has exceeded a certain second threshold value. In some embodiments, sets of contextual data that don't exceed said second threshold may still be used if an extra authentication factor (such as a static or dynamic password, or a biometric) has been successfully provided. In some embodiments, only sets of contextual data that have been collected prior to the moment of computing the updated user authentication data models and that satisfy certain conditions or criteria may be used for computing the updated models. These conditions or criteria may take into account elements such as: the times or time period that these sets of contextual data have been collected, the authentication scores corresponding to these sets of contextual data, or additional authentication elements such as additional authentication credentials provided together with these sets of contextual data. In some embodiments, different sets of contextual data that are used for computing the updated models may be given different weights. These weights may be a function of elements such as the aforementioned elements. For example, in some embodiments newer sets of contextual data may be given higher weights than older sets of contextual data.

Advantages of Some ConSec Authentication Systems Regarding Privacy Preservation

In some embodiments, non-computable contextual data may be anonymized using a cryptographic hash algorithm. Since cryptographic hash algorithms are irreversible, such an anonymization process ensures the privacy of the contextual data. In some embodiments, the anonymization transformation may also use a secret user-specific random key to defend against a dictionary attack. With the presence of this key, it is also not possible to correlate the contextual data across different users, which strongly enhances the privacy of the users.

Computable data, in particular location data such as the GPS location, the altitude, the sound/noise level and the magnetic fingerprint of the user's location may be anonymized by applying an LSH hashing algorithm. Two questions may arise. First, is it possible to reverse the location-hashes to find the original GPS location coordinates? And second, is it possible to find the locations that correspond to the location-hashes, if some actual locations frequently visited by the user are known? For example by means of a triangulation technique whereby one might assume that the location-hashes in night and day time likely correspond to home and office locations respectively and whereby the actual home and office locations might be obtained from publicly available information on for example social and professional network sites? It is not possible to find the GPS locations from the location-hashes for the following reasons. The location-hashes only reveal in a relative way the angular distance between the locations, without disclosing the actual geographic locations on the earth's surface. Therefore, the actual geographic locations are unknown. The angular distance between the locations disclosed by the location-hashes cannot be used to compute the approximate geographic distance between the locations, as the change in the angular distance between the location-hashes can be attributed equally well to a change in altitude or sound level as from a change in geographical surface coordinates. Therefore, the geographic locations corresponding to the location hashes cannot be retrieved with a triangulation technique as described above. For maximum privacy, the ConSec-App on the user's smartphone may keep the LSH parameters and the salt data securely on the phone without releasing them to the authentication server. The ConSec app on each user's smartphone may randomly generate its own (statistically) unique values for the LSH parameters and the salt, so that information across different users does not correlate. Therefore, the privacy of location data is also enhanced very strongly with the location-hash.

In some embodiments, privacy-sensitive contextual authentication data may be collected by a user's personal client computing device and sent to a server for analysis for other purposes than for authenticating the user. For example, in some embodiments contextual data may be collected by a health application, or an insurance application or a fitness application. For example, in some embodiments, an application may collect location data and/or acceleration data to find out more about the user's physical movements. Also, in these non-authentication contexts, certain data may be perceived by the user as privacy-sensitive data, and it may be advantageous to anonymize at least some of the collected contextual data. In some embodiments, the same or similar methods as described in this description in an authentication context, may also be used for anonymizing contextual data that are collected for non-authentication purposes. In other embodiments, other anonymization methods may be used for anonymizing contextual data that are collected for non-authentication purposes.

In some embodiments, detailed location data may be used, for example to analyse a user's physical movements, e.g., to find out a user's daily walking or running distance or more in general to find out how much physical effort a user may be doing for example on a daily basis. In some embodiments, the user's personal client computing device may collect for example detailed location data (such as GPS coordinates) and acceleration data. In some embodiments, the collected location data may be deemed to be privacy sensitive and may be anonymized by the user's personal client computing device before being forwarded to an application server for further processing. In some embodiments, the coordinates of the measured locations may be transformed according to an isometric or congruent geometrical transformation, for example by rotating and/or mirroring the Cartesian coordinate system with respect to which the coordinates of the locations have been expressed. In some embodiments the origin of the coordinate system remains fixed (i.e., the transformation doesn't comprise a translation).

In some embodiments, the parameters that define the congruent geometrical transformation may be determined or derived as a function of a salt that is secret and only known to the user's personal client computing device and which may have been generated randomly. As a consequence, it is not possible for a third party not knowing the transformation parameters to reverse the transformation in order to retrieve an original location from the location's transformed coordinates. However, if a third party knows or guesses some original locations and the corresponding transformed coordinates, the third party may be able to solve for the unknown transformation parameters. In some embodiments, the impact of a third party successfully solving for (or otherwise retrieving) the transformation parameter values may be minimized by regularly updating these parameters in a way that the new parameter values cannot be calculated by a third party from the old parameter values. For example, in some embodiments a new salt value may be generated regularly and the transformation parameters re-determined as a function of the updated salt value. In some embodiments, this update may for example be done on a daily basis. In some embodiments, this update may be done when the application notices that the user has been at rest for a minimum period of time (such as for example half an hour), whereby the application may detect from the location and/or acceleration data that the user is at rest, for example if the user has remained at the same location and/or if there has not been an acceleration measurement above a certain threshold for such a minimum amount of time. In some embodiments, the update may be done if the application detects, e.g., on the basis of the collected location and/or acceleration data, that the user is moving or has moved whereby the user's movement is such that the application may assume that the movement cannot be performed by the user without assistance of some powered vehicle. For example, the application may do the update if it detects that the user is moving (for longer than a minimum period of time of, for example, a minute) at a speed of for example more than 100 km/hour.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments; rather the scope of at least one embodiment of the invention is defined only in accordance with the following claims and their equivalents.

The invention claimed is:

1. A method to secure a user's interaction with a remotely accessible computer-based application, the method comprising the steps of:
   collecting one or more sets of contextual data;
   anonymizing the collected one or more sets of contextual data;
   transferring the anonymized contextual data sets to an authentication server;
   at the authentication server analyzing the received anonymized contextual data sets for authenticating the user;
   wherein the one or more sets of contextual data comprise values of one or more computable contextual data elements;
   wherein the step of anonymizing the collected one or more sets of contextual data comprises transforming a first value of at least one of said computable contextual data elements using a similarity preserving anonymization transformation; and
   wherein the values of at least some of the anonymized contextual data are a function of the original values of the collected contextual data prior to anonymization and the value of a salt.

2. The method of claim 1, wherein said similarity preserving anonymization transformation is parameterized by a parameter which is a function of said salt value.

3. The method of claim 1, wherein said anonymizing the collected one or more sets of contextual data is performed by an anonymizing component and wherein said salt value is known only to said anonymizing component.

4. The method of claim 1, further comprising generating the salt value using a random generator or a pseudo-random generator.

5. The method of claim 1, further comprising generating said salt value during an initialization phase and storing said generated salt value in non-volatile memory.

6. The method of claim 1, wherein said anonymizing the collected one or more sets of contextual data is performed on a personal client computing device associated with said user, whereby said salt value comprises a specific value that has been generated for that individual personal client computing device associated with said user and whereby that specific value is different from salt values generated for other personal client computing devices associated with other users.

7. The method of claim 1, wherein said analyzing the received anonymized contextual data for authenticating the user comprises exploiting a similarity between various received anonymized contextual data sets that is preserved by said similarity preserving anonymization transformation.

8. The method of claim 1, wherein said similarity preserving anonymization transformation comprises a Location Sensitive Hashing transformation.

9. The method of claim 8, wherein said similarity preserving anonymization transformation comprises a data-independent Location Sensitive Hashing transformation.

10. The method of claim 8, wherein said similarity preserving anonymization transformation comprises a Super Bit Location Sensitive Hashing transformation.

11. The method of claim 1, wherein said similarity preserving anonymization transformation preserves said similarity in a probabilistic sense.

12. The method of claim 1, wherein said similarity preserving anonymization transformation preserves said similarity in a deterministic sense.

13. The method of claim 1, wherein the one or more sets of contextual data further comprise values of one or more non-computable contextual data elements and wherein the step of anonymizing the collected one or more sets of contextual data further comprises transforming a second value of at least one of said non-computable contextual data elements using an identity relation preserving anonymization transformation and wherein said identity relation preserving anonymization transformation is parameterized by a parameter which is a function of said salt value.

14. The method of claim 1, further comprising the step of learning one or more user models for said user using at least some of said anonymized collected one or more sets of contextual data.

15. The method of claim 14, wherein the step of analyzing the received anonymized contextual data sets for authenticating the user comprises comparing at least some of said received anonymized contextual data sets with said learnt one or more user models.

16. The method of claim 15, further comprising generating a score that reflects a degree that said at least some of said received anonymized contextual data sets match said learnt one or more user models.

17. The method of claim 16, further comprising updating said learnt one or more user models.

18. The method of claim 17, wherein said updating of said learnt one or more user models is performed at regular intervals.

19. The method of claim 17, wherein said updating of said learnt one or more user models uses at least some anonymized contextual data sets that have been received since the previous occurrence of said updating of said learnt one or more user models.

20. The method of claim 1, wherein the steps of collecting one or more sets of contextual data, anonymizing the collected one or more sets of contextual data and transferring the anonymized contextual data sets to an authentication server, are performed at a personal client computing device associated with said user, whereby said personal client computing device is physically distinct from said authentication server.

21. The method of claim 20, wherein the steps of collecting one or more sets of contextual data and anonymizing the collected one or more sets of contextual data are performed by a software application running on said personal client computing device.

22. A method to secure a user's interaction with a remotely accessible computer-based application, the method comprising the steps of:
   collecting one or more sets of contextual data;
   anonymizing the collected one or more sets of contextual data;
   transferring the anonymized contextual data sets to an authentication server; and
   at the authentication server analyzing the received anonymized contextual data sets for authenticating the user;
   wherein the one or more sets of contextual data comprise values of one or more computable contextual data elements;
   wherein the step of anonymizing the collected one or more sets of contextual data comprises transforming a first value of at least one of said computable contextual data elements using a similarity preserving anonymization transformation; and
   wherein the one or more sets of contextual data further comprise values of one or more non-computable contextual data elements and wherein the step of anonymizing the collected one or more sets of contextual data further comprises said transforming a second value of at least one of said non-computable contextual data elements using an identity relation preserving anonymization transformation.

23. The method of claim 22, wherein said analyzing the received anonymized contextual data for authenticating the user comprises exploiting an identity between a first received value of a first contextual data element of a first received anonymized contextual data set and a second received value of a second contextual data element of a second received anonymized contextual data set.

24. The method of claim 22, wherein said identity relation preserving anonymization transformation comprises applying a cryptographic hashing algorithm.

25. A method to secure a user's interaction with a remotely accessible computer-based application, the method comprising the steps of:
   collecting one or more sets of contextual data;
   anonymizing the collected one or more sets of contextual data;
   transferring the anonymized contextual data sets to an authentication server;
   at the authentication server analyzing the received anonymized contextual data sets for authenticating the user; and
   learning one or more user models for said user using at least some of said anonymized collected one or more sets of contextual data;
   wherein the one or more sets of contextual data comprise values of one or more computable contextual data elements;
   wherein the step of anonymizing the collected one or more sets of contextual data comprises transforming a first value of at least one of said computable contextual data elements using a similarity preserving anonymization transformation; and
   wherein said step of learning one or more user models for said user using at least some of said anonymized collected one or more sets of contextual data comprises applying a machine learning algorithm to said at least some of said anonymized collected one or more sets of contextual data.

26. The method of claim 25, wherein said machine learning algorithm comprises a non-supervised machine learning algorithm.

27. The method of claim 25, wherein said machine learning algorithm comprises a clustering algorithm.

28. A system to secure a user's interaction with a remotely accessible computer-based application, the system comprising:
   a collection component adapted to collect one or more sets of contextual data;
   an anonymization component adapted to anonymize the one or more sets of contextual data collected by the collection component; and
   an authentication server adapted to analyze the anonymized one or more sets of contextual data;
   wherein the one or more sets of contextual data collected by the collection component comprise values of one or more computable contextual data elements;
   wherein the anonymization component is adapted to anonymize the collected one or more sets of contextual data by transforming a first value of at least one of said computable contextual data elements using a similarity preserving anonymization transformation;
   wherein the collection component is comprised in a personal client computing device associated with the user; and
   wherein the personal client computing device is physically distinct from the authentication server and whereby the authentication server is adapted to receive said anonymized one or more sets of contextual data over a data communication network linking the personal client computing device and the authentication server.

29. The system of claim 28, wherein the collection component is adapted to receive values of at least some contextual data elements of said one or more sets of contextual data from one or more hardware sensors comprised in said personal client computing device.

30. The system of claim 28, wherein the collection component is adapted to receive values of at least some contextual data elements of said one or more sets of contextual data from an operating system of said personal client computing device.

31. The system of claim 28, wherein the anonymization component is also comprised in the personal client computing device.

32. The system of claim 28, wherein at least the collection component is comprised in a software client application running on said personal client computing device.

33. The system of claim 32, wherein also said anonymization component is comprised in said software client application.

34. The system of claim 28, wherein said authentication server is adapted to analyze the anonymized contextual data for authenticating the user by exploiting a similarity between various received anonymized contextual data sets that is preserved by said similarity preserving anonymization transformation.

35. The system of claim 28, wherein said similarity comprises a measure of distance.

36. The system of claim 28, wherein said similarity preserving anonymization transformation comprises a Location Sensitive Hashing transformation.

37. The system of claim 36, wherein said similarity preserving anonymization transformation comprises a Super Bit Location Sensitive Hashing transformation.

38. The system of claim 28, further comprising a user model learning component adapted to learn one or more user models for said user using at least some of said anonymized collected one or more sets of contextual data.

39. The system of claim 38, wherein the authentication server is adapted to analyze the received anonymized contextual data sets for authenticating the user by comparing at least some of said received anonymized contextual data sets with said learnt one or more user models.

40. The system of claim 38, wherein said user model learning component is further adapted to update said learnt one or more user models.

41. The system of claim 40, wherein said user model learning component is further adapted to update said learnt one or more user models using at least some anonymized contextual data sets that have been received since the previous occurrence of said updating of said learnt one or more user models.

42. A system to secure a user's interaction with a remotely accessible computer-based application, the system comprising:
   a collection component adapted to collect one or more sets of contextual data;
   an anonymization component adapted to anonymize the one or more sets of contextual data collected by the collection component; and
   an authentication server adapted to analyze the anonymized one or more sets of contextual data;
   wherein the one or more sets of contextual data collected by the collection component comprise values of one or more computable contextual data elements;
   wherein the anonymization component is adapted to anonymize the collected one or more sets of contextual data by transforming a first value of at least one of said computable contextual data elements using a similarity preserving anonymization transformation; and
   wherein the values of at least some of the anonymized contextual data are a function of the original values of the collected contextual data prior to anonymization and the value of a salt.

43. The system of claim 42, wherein said similarity preserving anonymization transformation is parameterized by a parameter which is a function of said salt value.

44. The system of claim 42, wherein said salt value is known only to said anonymization component.

45. The system of claim 42, wherein said anonymization component is comprised in a personal client computing device associated with said user, whereby said salt value comprises a specific value that has been generated for that individual personal client computing device associated with said user and that is different from salt values generated for other personal client computing devices associated with other users.

46. The system of claim 42, wherein the one or more sets of contextual data collected by the collection component further comprise values of one or more non-computable contextual data elements and wherein said anonymization component is further adapted to anonymize the collected one or more sets of contextual data by transforming a second value of at least one of said non-computable contextual data elements using an identity relation preserving anonymization transformation and wherein said identity relation preserving anonymization transformation is parameterized by a parameter which is a function of said salt value.

47. A system to secure a user's interaction with a remotely accessible computer-based application, the system comprising:
   a collection component adapted to collect one or more sets of contextual data;
   an anonymization component adapted to anonymize the one or more sets of contextual data collected by the collection component; and
   an authentication server adapted to analyze the anonymized one or more sets of contextual data;
   wherein the one or more sets of contextual data collected by the collection component comprise values of one or more computable contextual data elements;
   wherein the anonymization component is adapted to anonymize the collected one or more sets of contextual data by transforming a first value of at least one of said computable contextual data elements using a similarity preserving anonymization transformation; and
   wherein the one or more sets of contextual data collected by the collection component further comprise values of one or more non-computable contextual data elements and wherein said anonymization component is further adapted to anonymize the collected one or more sets of contextual data by transforming a second value of at least one of said non-computable contextual data elements using an identity relation preserving anonymization transformation.

48. The system of claim 47, wherein said authentication server is adapted to analyze the received anonymized contextual data for authenticating the user by exploiting an identity between a first received value of a first contextual data element of a first received anonymized contextual data set and a second received value of a second contextual data element of a second received anonymized contextual data set.

49. The system of claim 47, wherein said identity relation preserving anonymization transformation comprises applying a cryptographic hashing algorithm.

50. A system to secure a user's interaction with a remotely accessible computer-based application, the system comprising:
   a collection component adapted to collect one or more sets of contextual data;
   an anonymization component adapted to anonymize the one or more sets of contextual data collected by the collection component;

an authentication server adapted to analyze the anonymized one or more sets of contextual data; and a user model learning component adapted to learn one or more user models for said user using at least some of said anonymized collected one or more sets of contextual data;

wherein the one or more sets of contextual data collected by the collection component comprise values of one or more computable contextual data elements;

wherein the anonymization component is adapted to anonymize the collected one or more sets of contextual data by transforming a first value of at least one of said computable contextual data elements using a similarity preserving anonymization transformation; and wherein said user model learning component is adapted to learn one or more user models for said user using at least some of said anonymized collected one or more sets of contextual data by applying a machine learning algorithm to said at least some of said anonymized collected one or more sets of contextual data.

51. A system to secure a user's interaction with a remotely accessible computer-based application, the system comprising:

a collection component adapted to collect one or more sets of contextual data;

an anonymization component adapted to anonymize the one or more sets of contextual data collected by the collection component;

an authentication server adapted to analyze the anonymized one or more sets of contextual data; and a user model learning component adapted to learn one or more user models for said user using at least some of said anonymized collected one or more sets of contextual data;

wherein the authentication server is adapted to analyze the received anonymized contextual data sets for authenticating the user by comparing at least some of said received anonymized contextual data sets with said learnt one or more user models;

wherein the one or more sets of contextual data collected by the collection component comprise values of one or more computable contextual data elements;

wherein the anonymization component is adapted to anonymize the collected one or more sets of contextual data by transforming a first value of at least one of said computable contextual data elements using a similarity preserving anonymization transformation; and wherein the authentication server is further adapted to generate a score that reflects a degree that said at least some of said received anonymized contextual data sets match said learnt one or more user models.

* * * * *